(12) United States Patent
Murtazin

(10) Patent No.: US 12,068,145 B2
(45) Date of Patent: Aug. 20, 2024

(54) LIQUID SAMPLE INTRODUCTION SYSTEM AND METHOD, FOR ANALYTICAL PLASMA SPECTROMETER

(71) Applicant: Thermo Fisher Scientific (Bremen) GmbH, Bremen (DE)

(72) Inventor: Ayrat Murtazin, Bremen (DE)

(73) Assignee: Thermo Fisher Scientific (Bremen) GmbH (DE)

( * ) Notice: Subject to any disclaimer, the term of this patent is extended or adjusted under 35 U.S.C. 154(b) by 388 days.

(21) Appl. No.: 17/225,871

(22) Filed: Apr. 8, 2021

(65) Prior Publication Data
US 2021/0265151 A1    Aug. 26, 2021

Related U.S. Application Data

(63) Continuation of application No. 15/372,112, filed on Dec. 7, 2016, now Pat. No. 10,978,282.

(30) Foreign Application Priority Data

Dec. 18, 2015   (GB) ..................................... 1522436

(51) Int. Cl.
| | |
|---|---|
| H01J 49/04 | (2006.01) |
| G01J 3/02 | (2006.01) |
| G01J 3/443 | (2006.01) |

(52) U.S. Cl.
CPC ........... *H01J 49/045* (2013.01); *G01J 3/0267* (2013.01); *G01J 3/443* (2013.01); *H01J 49/0409* (2013.01); *H01J 49/0454* (2013.01)

(58) Field of Classification Search
None
See application file for complete search history.

(56) References Cited

U.S. PATENT DOCUMENTS

| | | |
|---|---|---|
| 6,107,628 A | 8/2000 | Smith et al. |
| 6,583,408 B2 | 6/2003 | Smith et al. |

(Continued)

FOREIGN PATENT DOCUMENTS

JP    2012148256 A   *   8/2012

OTHER PUBLICATIONS

Shigeta et al., ("Evaluation of the analytical performances of a valve-based droplet direct injection system by inductively coupled plasma-atomic emission spectrometry," Journal of Analytical Atomic Spectrometry, 30, 1609-1616, 2015.*

*Primary Examiner* — Andrew Smyth
(74) *Attorney, Agent, or Firm* — Klarquist Sparkman, LLP

(57) ABSTRACT

A liquid sample introduction system for a plasma spectrometer includes a sample container for holding a liquid sample, a surface acoustic wave (SAW) nebulizer, arranged to receive a liquid sample from the sample container, an electronic controller for supplying electrical power to the SAW nebulizer so as to produce a surface acoustic wave on a surface of the SAW nebulizer, for generating an aerosol from the supplied sample liquid, and an aerosol transport arrangement for receiving the aerosol from the SAW nebulizer and carrying it into a plasma or flame of a spectrometer. The electronic controller is further configured to control the electrical power to the SAW nebulizer so as to permit adjustment of the aerosol parameters, and to control the aerosol transport arrangement so as to permit adjustment of the aerosol delivery into the plasma or flame of the spectrometer.

36 Claims, 19 Drawing Sheets

(56) References Cited

U.S. PATENT DOCUMENTS

| | | |
|---|---|---|
| 6,803,565 B2 | 10/2004 | Smith et al. |
| 6,831,724 B2 | 12/2004 | Ohta et al. |
| 8,692,192 B2 * | 4/2014 | Goodlett ............ H01J 49/0454 435/173.6 |
| 2008/0099671 A1 | 5/2008 | Sakata et al. |
| 2012/0009231 A1 | 1/2012 | Herbert et al. |
| 2012/0187209 A1 * | 7/2012 | Friend .................... A61P 11/00 239/4 |
| 2014/0083174 A1 | 3/2014 | Reboud et al. |
| 2014/0283627 A1 | 9/2014 | Hattingh et al. |

* cited by examiner

FIG. 1

Aerosol mixing

FIG. 12

LIQUID SAMPLE INTRODUCTION SYSTEM AND METHOD, FOR ANALYTICAL PLASMA SPECTROMETER

CROSS-REFERENCE TO RELATED APPLICATION

This application is a continuation for U.S. patent application Ser. No. 15/372,112, filed on Dec. 7, 2016. U.S. application Ser. No. 15/372,112 claims the priority benefit under 35 U.S.C. § 119 to British Patent Application No. 1522436.3, filed on Dec. 18, 2015. The aforementioned applications are incorporated herein by reference.

FIELD OF THE INVENTION

This invention relates to a liquid sample introduction system having a nebulizer, for an analytical plasma optical emission or mass spectrometer. The invention also relates to a method of liquid sample introduction for an analytical plasma spectrometer, as well as a method of nebulizing a liquid sample therefor.

BACKGROUND OF THE INVENTION

Plasma Optical Emission Spectrometry (OES) and Plasma Mass Spectrometry (MS) are well known techniques for the analysis of trace elemental concentrations in liquids. A plasma may be formed using microwaves (e.g., Microwave Induced Plasma Optical Emission Spectrometry (MIP-OES) or Microwave Induced Plasma Mass Spectrometry (MIP-MS)), or by using an inductively-coupled system (e.g., Inductively Coupled Plasma Optical Emission Spectrometry (ICP-OES) or Inductively Coupled Plasma Mass Spectrometry (ICP-MS)), each being examples of techniques employing atmospheric-pressure plasmas. Typically, detection limits extend to parts per billion (ppb) levels for ICP-OES, and to parts per trillion (ppt) levels for ICP-MS. Atomic Absorption (AA) and Atomic Fluorescence Spectroscopy (AFS) are also well known techniques, utilizing a flame for atomizing sample material. These various techniques are often used in conjunction with one another in the laboratory. For clarity and consistency in the following text, the term plasma spectrometer is employed, but it is to be understood that this encompasses any device that includes a torch for producing a plasma or flame.

The torches employed in the various analytical techniques above differ in their details. However the principle is common to each: liquid samples are usually diluted and aspirated using a nebulizer or some form of droplet generator, and are then propelled out of an outlet of the nebulizer or droplet generator into an inert or flame gas stream which carries droplets of the sample-containing liquid into a torch and thereby into the plasma or flame. The plasma discharge is sufficiently hot to cause the droplets of liquid entering the plasma to be progressively vaporized, atomized and then partially ionized. Atomized and ionized material is excited and relaxes to emit characteristic wavelengths of light detected by the optical spectrometer in the case of ICP-OES, and ionized material is directed into a vacuum system, through an ion optical system and a mass analyzer in the case of ICP-MS.

Typically the sample-containing liquid is formed into a stream of droplets using a pneumatic nebulizer utilizing a stream of gas, such as argon in the case of ICP. Pneumatic nebulizers produce droplets with a wide range of sizes. However both plasmas and flames are inefficient at dissociating significant quantities of large droplets. The maximal diameter of the droplets in an aerosol suitable for ICP spectrometry may be estimated or determined empirically. The specific size depends on a variety of factors, such as the total amount of the aerosol delivered into the plasma (plasma loading) and also on the characteristics of the ICP generator, the plasma torch and the load coil design employed. In a multidrop aerosol, 10 μm seems to be a typically size limit. Larger droplet sizes can apparently be employed in single droplet introduction systems—e.g., in S. Groh et al., Spectrochimica Acta Part B, vol. 64, pp. 247-254, 2009, droplet sizes up to 70 μm were used, and in K. Shigeta et al., Journal of Analytical Atomic Spectrometry, vol. 30, pp. 1609-1616, 2015, droplets even up to 300 μm were shown to generate an analytical signal in ICP, although using a specially designed torch. Furthermore it is generally recognized that, in order to obtain optimal analytical figures of merit, the droplet size distribution should be as narrow as possible.

To address the problem presented by larger droplet sizes, a spray chamber is typically placed between the nebulizer and the torch, to separate the larger droplets from the smaller droplets, the latter being preferentially carried by the flow of gas into the torch. As a result, typically no more than 1-2% of the nebulized sample-containing liquid (in the cases of ICP-OES and ICP-MS), is in the form of sufficiently small droplets suitable for processing within the torch. Such low efficiency in pneumatic-based sample introduction systems (SIS) is however undesirable: for example, the analysis of microsamples (either carried out directly or using hyphenated techniques) using such apparatus is very challenging. Low efficiency also results in the production of large quantities of waste material, and in serious memory effects, which in turn limits sample throughput. Recent developments in pneumatic nebulizers have resulted in an increase in input efficiency (say, up to 10%) but at the cost of reduced sample throughput.

As well as maximum droplet size, and droplet size distribution limitations, droplet number density (or aerosol concentration) and initial droplet velocity are important parameters in sample introduction systems. Droplet number density and initial droplet velocity define to a great extent the course of secondary and tertiary processes in spray chambers, and therefore the properties and amount of the aerosol entering the plasma. It is considered desirable that these parameters are as small as possible.

Maximizing the amount of sample supplied to the plasma per unit of time is desirable, because higher sample delivery rates result in better sensitivity. On the other hand, excessive volumes of liquid can cool or, in worst cases, extinguish the plasma (plasma loading). Higher sample delivery rates also increase the unwanted effects of matrix species within the analysis. So, there is an optimal value or range of sample delivery rates that trades off these competing properties. This value or range is determined by many factors, such as sample type (analyte type, matrix, solvent, relative concentrations etc.), and plasma parameters (power, gas flow rate, etc.). A typical range of sample delivery rates for current pneumatic nebulizer based SISs, with water solutions, might span 10-150 μL/min. At the same time, sample constituents concentrations may vary across orders of magnitude. For one element, the concentration might be at the detection limit of the analyzer, whereas another element might be so abundant as to place the detector into a non-linear range.

The central channel gas flow rate used to transfer sample aerosol into the plasma has also fundamental constraints. It should be high enough that a channel is formed on the plasma axis, which is a prerequisite for effective introduction of aerosol droplets into the hot and dense plasma. But, again, an excessive amount of central gas degrades the plasma robustness by deteriorating its excitation/ionizing properties. The optimum central channel gas flow rate, from the point of view of the plasma conditions, can be estimated from experiments with dry plasma, when the sample is introduced in waterless form e.g. using laser ablation, and lies (for ICP plasma) at about 0.4 L/min. It is clear that, for wet plasma, this value should be even less. So the range 0.2-0.3 L/min is seen as very promising for achieving "super-robust" conditions in ICP plasma.

Pneumatic nebulizers suffer from a lack of flexibility (variability). Adjustment of sample delivery rates requires time consuming equipment changes. Moreover, the fundamentally stochastic nature of the pneumatic nebulization technique, and its strong dependence on both gas flow and sample liquid parameters, can often result in sample delivery rate instability together with control problems, both of which in turn can lead to degraded analytical performance.

In order to address the issues of unfavorable aerosol properties and inflexibility, other forms of sample nebulization have been proposed. One such technique employs an electronically controlled piezoelectric actuator, the nebulization efficiency of which is independent of gas flow rates. The electronic control also permits power tuning, for sample delivery rate adjustment, thus addressing the invariability drawbacks of pneumatic nebulizers. Moreover, the inherent stability of the electronics improves the droplet generation stability.

Piezoelectric driven dispensers (PEDDs) can be broadly categorized into two groups: so called "drop on demand" (DoD) devices that produce single isolated droplets for sequential transmission to the plasma, see for example WO-A-2014/056807, and aerosol devices which produce multiple small droplets for simultaneous introduction into the plasma. DoD PEDDs can produce larger droplets (20-100 μm diameters) that are extremely reproducible, have a precisely known diameter, and are highly directional. The signal to noise and signal to background ratios are high. Their downside is a relatively slow sample delivery rate. Aerosol PEDDs, by contrast, can generate large numbers of smaller droplets (diameters of between 5 and 10 μm or less), but the direction of travel of generated droplets is harder to control and this leads to a non-optimized transport efficiency, with consequential reductions in sensitivity and increases in memory effects.

Nevertheless, aerosol PEDDs overcome the main drawbacks of pneumatic nebulizers: they produce droplets that are easy to transport into the plasma (because of their relatively small size) and some of them are free from clogging. They are also robust, simple, compact and inexpensive to build.

Aerosol PEDDs proposed for commercial use in analytical spectrometry can themselves be subdivided into two: vibrating mesh nebulizers (VMNs) and ultrasonic nebulizers (USNs). In VMN, the aerosol is produced with the assistance of a membrane having μm-diameter holes formed in it, by for example chemical or laser etching. The membrane is then mechanically attached to an electronically controlled piezo actuator.

In USN, the aerosol is produced as a result of bulk acoustic waves deriving from the nebulizer body. SIS employing USNs are commercially available, e.g., the U5000AT+ and U6000AT+from Teledyne Cetac Technologies, of Omaha, Nebraska, USA. They are characterized by a relatively narrow droplet size distribution, a resistance to clogging, and wide liquid uptake range, leading to highly sensitive analytical results.

The main drawback of such USN PEDD nebulizers though is their cost and start up time. There is a relatively high electrical power requirement (20-50 W), and redundant power dissipates also on the actuator surface leading to deterioration in long term stability as well as matrix effects. Liquid feeding is also not optimal in a USN PEDD.

The present invention seeks to address these problems with the prior art. In particular, aspects of the present invention seek at least to ameliorate one or more of the problems of matrix effects (which limit analytical accuracy), short and long term signal instability defining the precision of analysis, insufficient sensitivity in respect of certain elements, limited signal dynamic range, and memory effects which can influence analytical time.

SUMMARY OF THE INVENTION

According to a first aspect of the present invention, there is provided a liquid sample introduction system in accordance with one embodiment of the present invention.

The invention also extends to a Surface Acoustic Wave (SAW) nebulizer in accordance with another embodiment of the present invention.

According to a further aspect of the present invention, there is provided a method of introducing a liquid sample into an analytical plasma spectrometer, in accordance with another embodiment of the present invention.

The system, device and method address such considerations as absence of cross contamination, chemical resistance of any sample contacting surface, absence of large droplets in the aerosol, high stability of aerosol flow and short stabilization time. Aspects of the invention provide for increased mechanical and chemical robustness. Preferred embodiments contemplate a solid, one piece, relatively inexpensive, low power system and method, which is resistant to clogging and may, in some specific embodiments, permit a pumpless and/or tubeless sample supply arrangement to be employed. Chemical robustness may be provided, in preferred embodiments, by the use of coatings or construction materials that are highly resistant to aggressive media. The controllability and adjustability of embodiments of the present invention offer increased matrix robustness, flexibility, reduction of interference, stable sample flow and dynamic range.

Further advantages and preferred arrangements will become apparent upon review of the following description and drawings, and from the accompanying claims.

BRIEF DESCRIPTION OF THE DRAWINGS

The invention may be put into practice in a number of ways, some of which will now be described by way of example only and with reference to the accompanying drawings in which:

FIG. 1 shows, schematically, an analytical plasma spectrometer having a liquid sample introduction system with a liquid handling system, a SAW nebulizer and an aerosol transport apparatus, in accordance with a first embodiment of the present invention;

FIG. 12 shows side sectional and top views respectively of a pair of SAW nebulizers in an aerosol transport system, to illustrate an aerosol mixing technique.

DETAILED DESCRIPTION OF A PREFERRED EMBODIMENT

Figure 1:
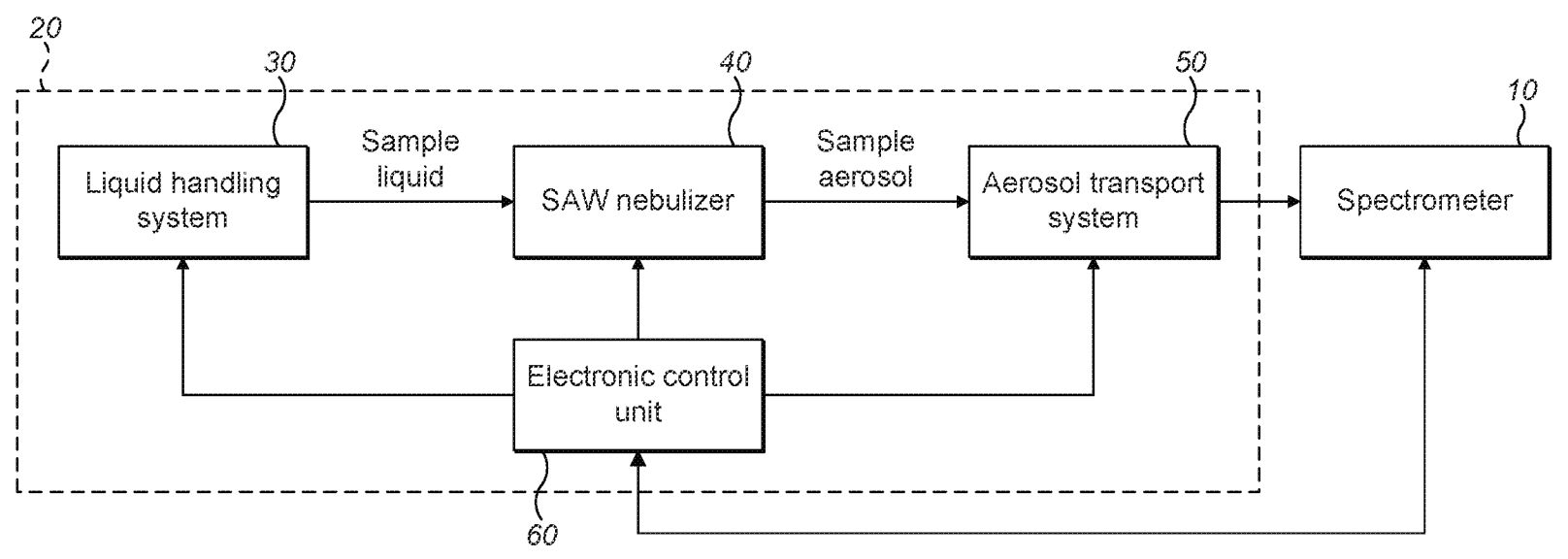
Figure 2A:
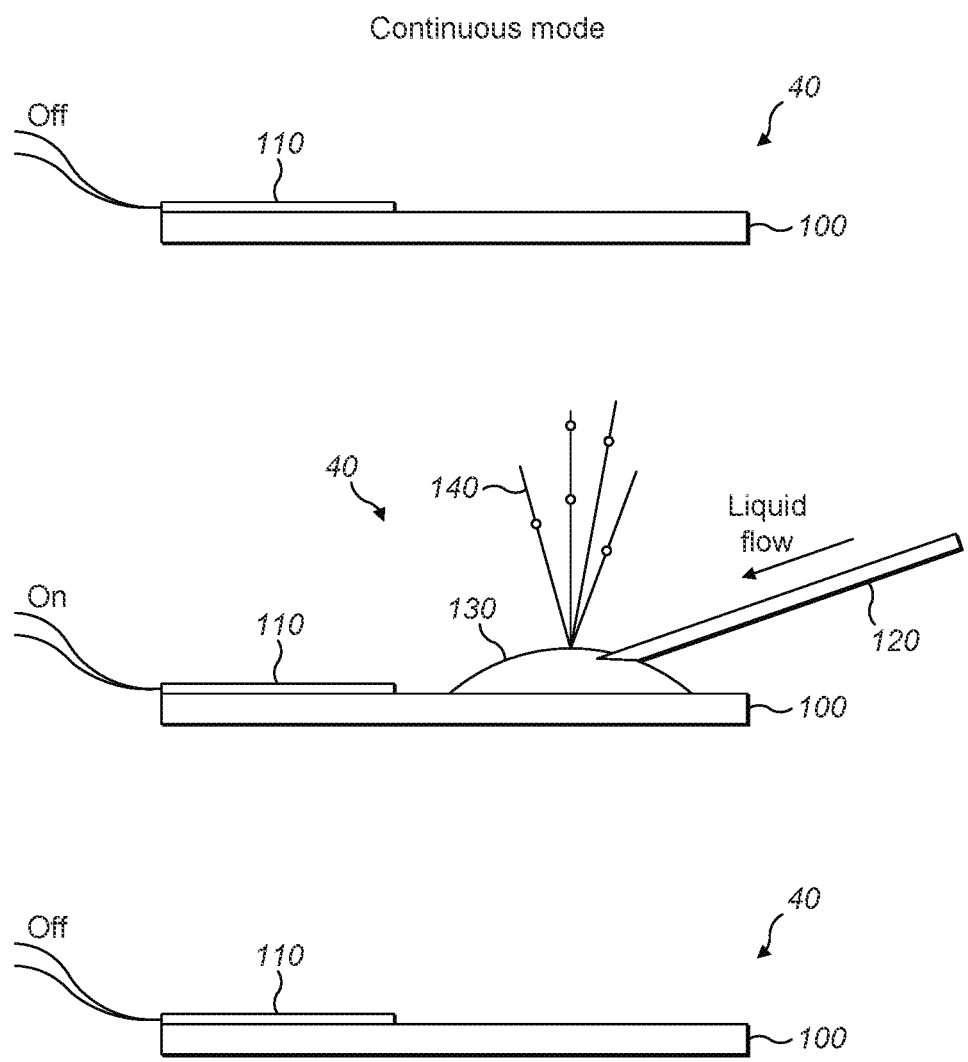
FIG. 2a, 2b and 2c show, respectively, schematic side views of a continuous, a pulsed and a mixed mode of sample delivery to the SAW nebulizer in the embodiment of FIG. 1.

FIG. 1 shows, schematically, an analytical plasma spectrometer 10 having a liquid sample introduction system 20 in accordance with a first embodiment of the present invention. FIG. 1 shows the spectrometer in block diagram format and a brief introduction to the function of the main components in the system will first be provided. More specific details of each of the components in FIG. 1 will then be described subsequently, with reference to later Figures.

The liquid sample introduction system 20 comprises a liquid handling system 30, a surface acoustic wave (SAW) nebulizer 40, an aerosol transport arrangement 50, and a system controller 60. The liquid handling system 30 includes a liquid sample reservoir (not shown in FIG. 1) in which a liquid sample is contained. The liquid handling system 30 is arranged to transport the liquid sample from the sample reservoir to the SAW nebulizer 40 in one of various ways that will be described in further detail in the subsequent figures.

Liquid sample received at the SAW nebulizer 40 is nebulized there so as to form an aerosol containing small droplets of sample liquid. The aerosol enters the aerosol transport arrangement 50, and is then transported through it—with optional removal of solvent (desolvation). Upon exit from the aerosol transport arrangement, the (optionally desolvated) droplets are introduced into a plasma or flame of the analytical plasma spectrometer 10. The resulting products are then analyzed in known manner.

The details of the plasma spectrometer are not themselves relevant to the present invention. However it will be understood that any suitable analytical instrument employing a plasma or torch may be employed, for example, an Inductively Coupled Plasma (ICP) or Microwave Induced Plasma (MIP) Mass spectrometer (ICP-MS or MIP-MS) or Optical Emission Spectrometer (ICP-OES or MIP-OES), an Atomic Absorption (AA) spectrometer, an atomic fluorescence spectrometer, and so forth.

Having provided a brief overview of the liquid sample introduction system 20 and its interface with the plasma spectrometer 10, a more detailed description of the individual components of the system will now be provided.

Liquid Handling System

The liquid handling system 30 is employed to transfer a sample, diluents, a matrix modifier and/or a rinsing solution onto the working surface of the SAW nebulizer 40. All of the components of the liquid handling system 30 are preferably free from cross contamination effects, are chemically resistant, and are biocompatible.

Liquid feed to the SAW nebulizer 40 may be in a continuous mode (or, at least, a quasi continuous mode), a pulsed mode (individual droplets) or a mixture of the two modes.

As will be explained later, the SAW nebulizer 40 includes a piezoelectric substrate 100 upon which is formed an interdigital transducer (IDT) 110 for generating a surface acoustic wave on the substrate surface. In a continuous mode of operation, as shown in FIG. 2a, sample liquid is supplied from a sample container (not shown in the Figures) to the surface of the substrate 100 of the SAW nebulizer 40 as a substantially continuous flow, through a liquid feeding line 120 such as a capillary. The liquid arriving at the surface of the substrate 100 is labelled 130 in FIG. 2a, where it is nebulized by the SAW nebulizer 40 to create an aerosol labelled 140 in that Figure. It will be noted that, in the "off" mode in FIG. 2a, the capillary is not shown, but this is not to imply that the capillary is necessarily moved away in that "off" mode. Depending upon the application, the degree of contamination prevention, and other factors, the capillary in the continuous mode may be stationary, or may be moved away so as to avoid contamination during the step of sample nebulization.

The sample liquid may be brought to the surface of the substrate 100 either using a pump (not shown), or through self-aspiration (pumpless). Where a pump is employed, it is desirable that the flow rate is controlled, for example by the electronic controller 60 (FIG. 1) so that liquid flows onto the SAW nebulizer at a rate in the range of sub-μL/min—hundreds μL/min. The liquid flow rate can be matched to the nebulization rate, or may be higher. In the latter case, excess sample liquid may be drained away from the substrate surface to a collection receptacle (also not shown) for optional reuse.

The continuous mode illustrated in FIG. 2a may also be realized by feeding the liquid sample from coupled separation techniques such as liquid chromatography, ion chromatography, capillary electrophoreses, and so forth.

Figure 2B:
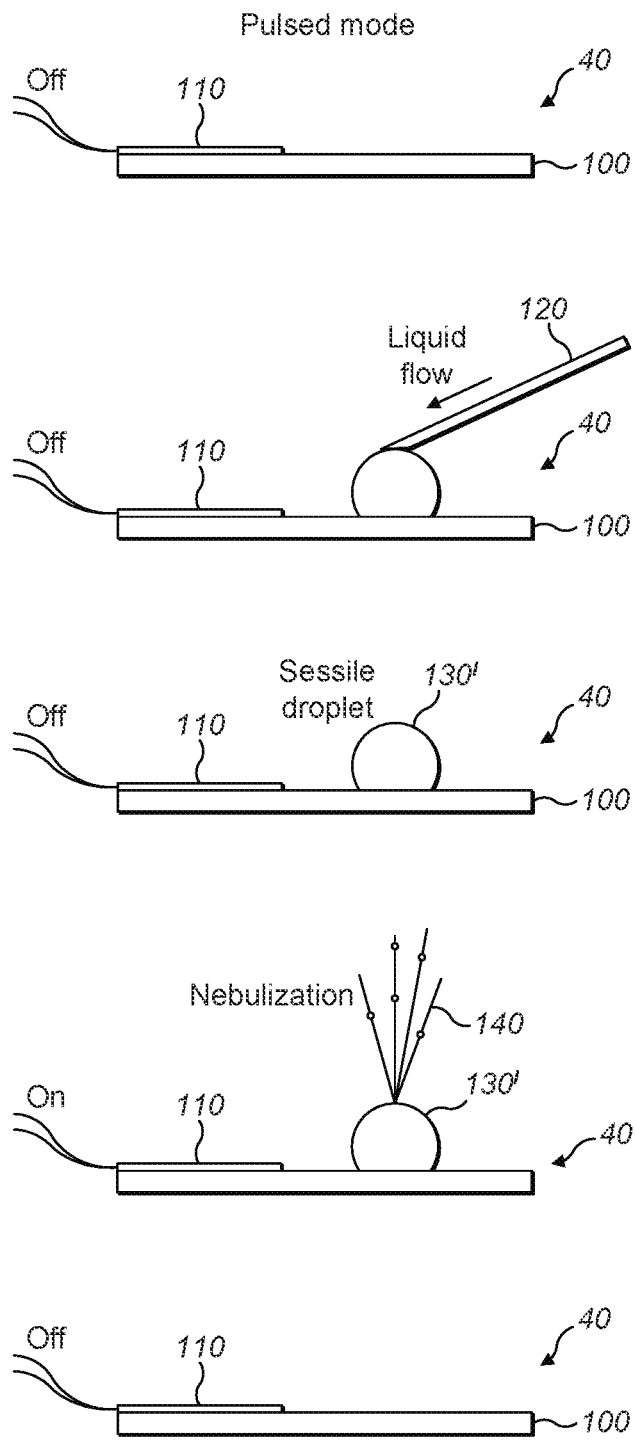

FIG. 2b shows an alternative, pulsed (modulated) sample delivery technique, in which individual droplets are supplied to the surface of the substrate 100. In the arrangement of FIG. 2b, a precisely and accurately dosed amount of liquid (again, preferably under the control of the electronic controller 60) is deposited on the surface of the substrate 100 of the SAW nebulizer 40, once more (in this example) using a liquid feed line 120. The supplied sample liquid then remains upon the surface of the substrate in the form of a single sessile droplet 130' where it is then nebulized to form an aerosol 140.

In this pulsed mode, the liquid sample introduction system 20 is capable of operating as a full consumption device, which facilitates the handling of microsamples and reduces the amount of waste. The area of the transient analytical signal generated during nebulization of the sessile droplet 130' is independent of nebulization efficiency, which in turn may depend on sample physicochemical properties. The pulsed technique of FIG. 2b reduces such sample introduction related matrix effects.

Figure 4:
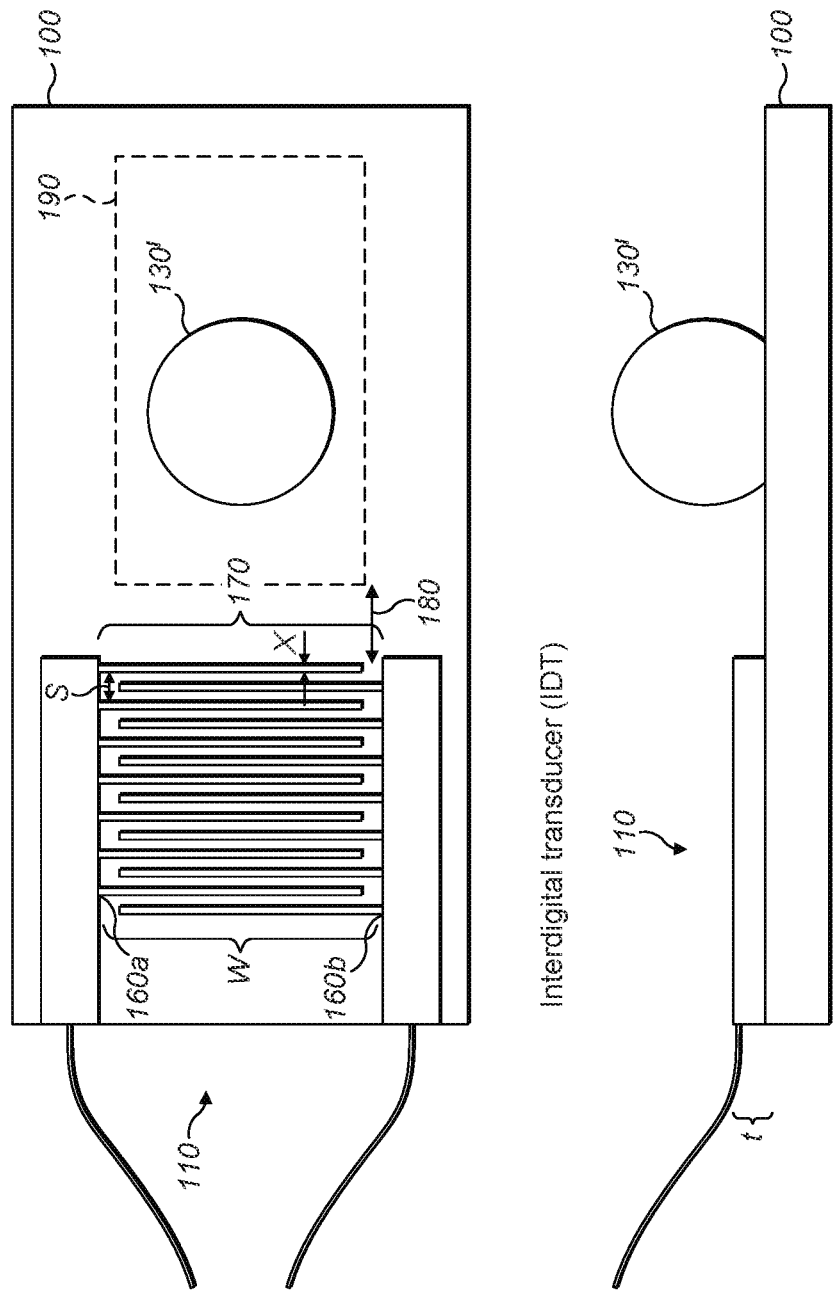
FIG. 4 shows, in plan and side view, a SAW nebulizer according to an embodiment of the present invention.

Uncontrollable evaporation of the sessile droplet 130' as it sits upon the surface of the substrate 100 of the SAW nebulizer 40 is undesirable, since this results in a sample of unknown/undefined concentration when nebulized. Therefore, optimally, a high nebulization rate should be selected in this pulsed sample solution feeding technique. However, if the evaporation of the sessile droplet 130' is measured—for example, by using a video camera—then the evaporation of the sessile droplet 130' can be employed advantageously. In particular, a measurable real time increase in the initial sample concentration can be determined, so as to permit improvement in the sensitivity of the analytical method.

A third, mixed mode of operation is illustrated in FIG. 2*c*. In this mode, the liquid sample is delivered to the substrate 100 as one pulse or a series of pulses forming separate sessile droplets 130' which are then nebulized, during a first, measurement time period. In other words, during that measurement time period, sample delivery to the SAW nebulizer proceeds as described above in respect of FIG. 2*b*. These stages of analysis are shown in the top 4 images of FIG. 2*c*.

Once measurement of the sample has concluded, and the last sessile droplet has been nebulized (5th Figure down, FIG. 2*c*), a continuous flow of rinsing solution is then applied using the techniques described in connection with FIG. 2*a* above, during a first cleaning time period. This is illustrated in the bottom two images in FIG. 2*c*. In this manner, the SAW nebulizer 40 can be cleaned between experiments, for example between experiments using different samples to avoid cross contamination. Although in FIG. 2*c* the liquid feed line 120 is labelled the same in the pulsed and continuous flow images, it will of course be understood that this does not necessarily imply that the same liquid feed line is employed each time. For example, in order to minimize cross contamination, the liquid feed line used for a first sample analysis during a first measurement period may be different both to the liquid feed line used to supply the rinsing solution during the first cleaning time period, and also to the liquid feed line employed to supply a second sample fluid to be analyzed in a subsequent second measurement time period. All of the liquid delivery steps may be controlled via the electronic controller 60.

Different types of pumps can be used for feeding sample solutions onto the surface of the substrate 100 of the SAW nebulizer 40, in a repeatable and reproducible manner. For example, the pump may be a syringe pump, a gas-displacement pump, a peristaltic pump or a piezomicropump. Piezomicropumps are particularly preferred because of their compact, low-cost design and direct electronic control. In this manner, a one-piece aspirating-nebulizing device may be realized, which is driven by common electronics.

Furthermore, although a single pump is described above, it will be understood that two or more different pumps or pumping principles could be used, for example, one pump for supplying a liquid sample to the SAW nebulizer 40, and another pump for feeding rinsing solution to the SAW nebulizer 40.

Although a pump-driven sample delivery technique provides optimal control of flow rate and/or sessile droplet volume, gravity or capillary-force driven liquid flows can also be used to deliver sample liquid to the surface of the SAW nebulizer 40. In the case of the pulsed system exemplified in FIG. 2*b*, either a manual or an automatic pipette(s), with permanent or disposable tips can be used.

It will of course be recognized that various multiport valve(s), lines, loop(s), fittings, adapters and other typical liquid handling and microfluidics components may be included, as considered necessary or desirable by the skilled person. None of these are shown in FIGS. 2*a*, 2*b* and 2*c*, whose features are restricted to the main functional aspects of preferred embodiments of a liquid handling system 30, for clarity and ease of understanding.

FIGS. 3*a*-3*d*, and FIGS. 3*e* and 3*f*, show, respectively, two different interfaces between the liquid feed line 120 and the SAW nebulizer 40. In a first, dribble interface, shown in FIGS. 3*a*-3*d*, constant liquid contact is provided between the liquid feed line (e.g., the liquid feed line 120 of FIGS. 2*a*, 2*b* and 2*c*) and the surface of the SAW nebulizer 40. The liquid feed line 120 can be a circular or rectangular capillary, a microchannel embedded in a nebulizer, a wick made from any porous and chemically resistant medium, or some combination of these. As will be seen, the liquid may be introduced to the surface of the SAW nebulizer 40 either from above (FIG. 3*a*/3*b*) or below (FIG. 3*c*/3*d*). The latter figures (3*c*/3*d*) illustrate one specific variant of a microchannel embedded in a nebulizer (a channel drilled or otherwise formed in the substrate). Other variants of such a microchannel are of course possible, such as a groove on top of the substrate surface, either open on top or closed by means of a coating, etc.

As an alternative to the dribble system of FIGS. 3*a*-3*d*, a jet system may instead be employed, and this is illustrated in FIGS. 3*e* and 3*f*. Here, there is no constant liquid contact between the liquid feed line 120 and the surface of the SAW nebulizer 40; instead an end of the liquid feed line 120 is spaced from the substrate 100 of the SAW nebulizer 40. The gap or spacing is too great to maintain a liquid bridge (as a result of wetting force) between the liquid feed line 120 and the surface of the SAW nebulizer 40. Hence, a jet of sample liquid 150 (FIG. 3*e*) is directed from the end of the liquid feed line 120 toward the surface of the SAW nebulizer 40.

Each of the interfaces shown in FIGS. 3*a*-3*f* may be employed to supply sample liquid in the continuous, the pulsed or the mixed modes of FIGS. 2*a*, 2*b* and 2*c*.

As well as the different positions of the end of the liquid feed line 120 relative to the surface of the SAW nebulizer 40, in terms of spacing between the two (i.e. as illustrated in FIGS. 3*a*-3*d* in comparison with FIGS. 3*e*-3*f*), the position of the end of the liquid feed line 120 relative to the surface of the SAW nebulizer 40 in a transverse direction may also be varied. For example, the liquid feed line 120 can be positioned either at the boundary, or in the center of the nebulizer's working surface/acoustic beam.

SAW Nebulizer

One suitable configuration for a SAW nebulizer 40 is shown in FIG. 4, in plan and side views respectively. The nebulizer comprises a substrate 100 formed of a piezoelectric material. LiNbO3 is considered to be the most efficient piezoelectric material for this purpose. On the surface of the substrate 100 is an interdigital transducer (IDT) 110. The IDT 110 comprises first and second generally parallel outer electrodes 160*a*, 160*b* which are connected to the electrical controller 60 for supply of an RF voltage thereto. Extending between the first and second outer electrodes 160*a*, 160*b*, in a transverse direction relative to those outer electrodes, is a series of transducer elements 170. Each outer electrode 160*a*, 160*b* is connected to a respective plurality of the transducer elements 170. The transducer elements 170 of each electrode are interdigitated in that a first element extends from the first electrode 160*a* toward (but not as far as) the second electrode 160*b* whereas both adjacent elements extend from the second electrode 160b toward but not as far as the first electrode 160a. In FIG. 4, the separation between the first and second outer electrodes 160a, 160b, in that transverse direction, is shown as "w". This separation defines the width of the working surface. The interdigital spacing (along the SAW nebulizer, in a direction parallel with the direction of elongation of the first and second outer electrodes 160a, 160b) is marked as "s". This is the distance between the centers of the transducer elements, and, along with the width "x" of each transducer element (of the total electrode separation, i.e. working width w) defines the main frequency of the nebulizer.

The IDT 110 also has a thickness "t" (side view of FIG. 4). The IDT performance is essentially determined by the parameters of the transducer elements (width, length, separation, thickness etc.). In particular, the thickness of the IDT 110 determines the impedance of the IDT 110, and therefore the temperature dissipated in the SAW nebulizer 40 and, possibly, its efficiency. The electrode width x may be chosen so as to provide a controlled single phase unidirectional transducer, for concentrating vibration power in one direction.

Figure 2C:
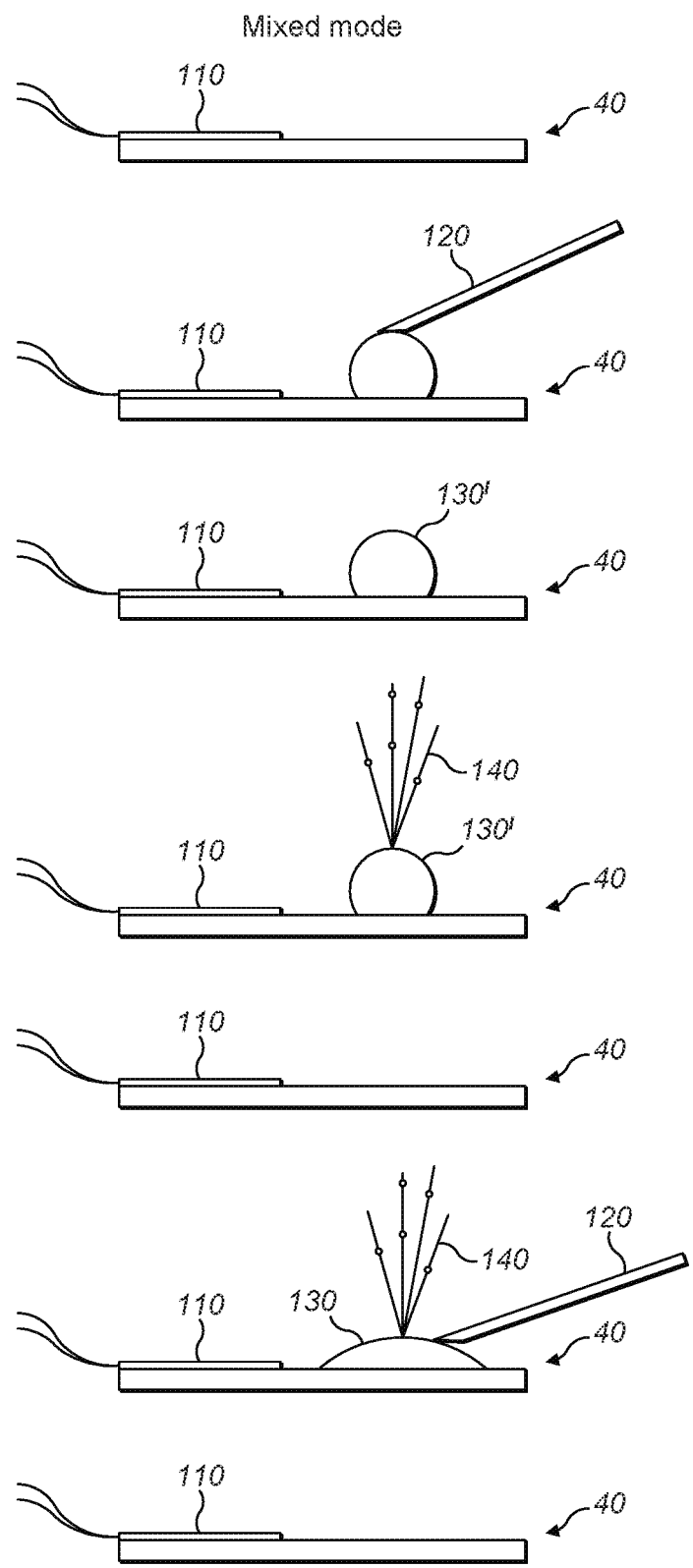
Figure 3A:
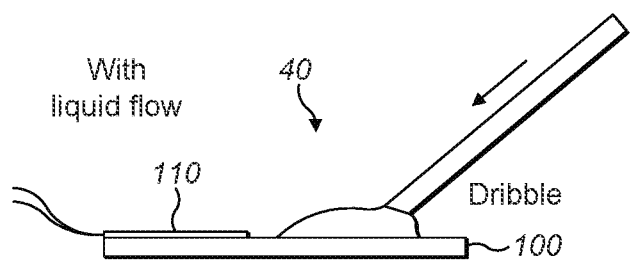
FIGS. 3a-3d, and FIGS. 3e and 3f, show, respectively, two different interfaces between a liquid feed line of the liquid handling system, and the SAW nebulizer, of FIG. 1.
Figure 3B:
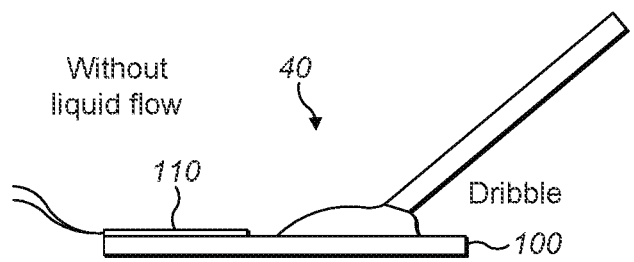
Figure 3C:
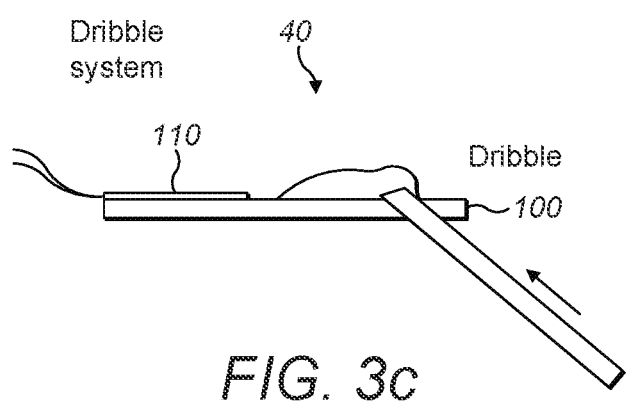
Figure 3D:
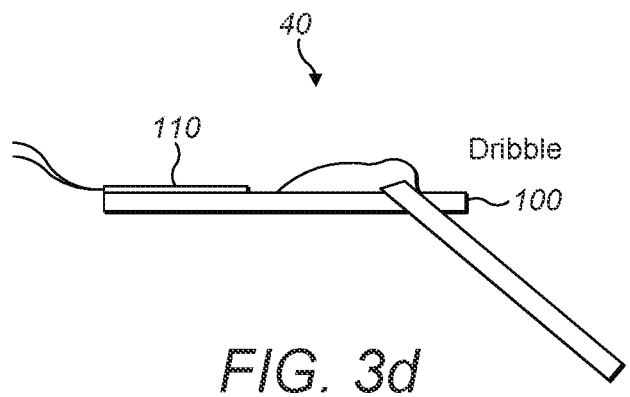
Figure 3E:
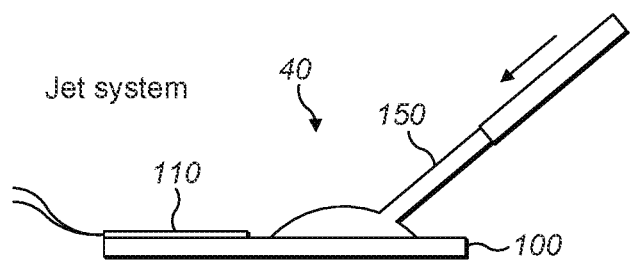
Figure 3F:
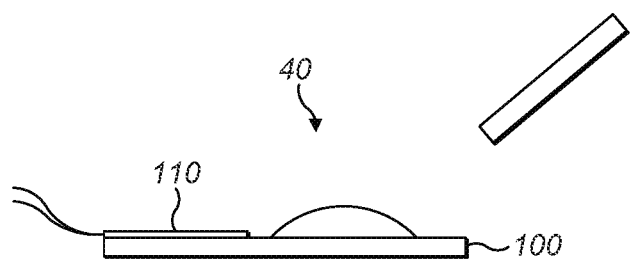

The working area of the SAW nebulizer 40 is indicated in FIG. 4 by dotted line 190. The working area 190 receives the sessile droplet 130' (FIGS. 2b and 2c) in pulsed mode of operation, or the liquid flow in the case of a continuous mode (FIG. 2a). The working area 190 is separated from the IDT 110 by a gap 180, and the width w of the IDT 110 determines the width of the nebulizer's working area 190.

In a variation of the embodiment shown in FIG. 4, an additional reflector electrode may be formed on the rear side of the IDT 110, for example as disclosed in J. Ju et al., Sensors and Actuators A: Physical, vol. 147, pp. 570-575, 2008.

To generate a surface acoustic wave, an RF signal (whose characteristics are discussed in further detail below) is supplied from the electronic controller 60 to the IDT 110. The SAW nebulizer 40 may operate in progressive wave and standing wave modes. Standing wave mode is more efficient: it allows smaller droplets to be obtained, and the generated aerosol 140 propagates strictly normally to the surface. For realization of a standing wave mode, 2, 4 or more IDTs 110 can be used. For example, a pair of opposing IDTs can be employed to produce the standing surface acoustic wave.

Figure 5:
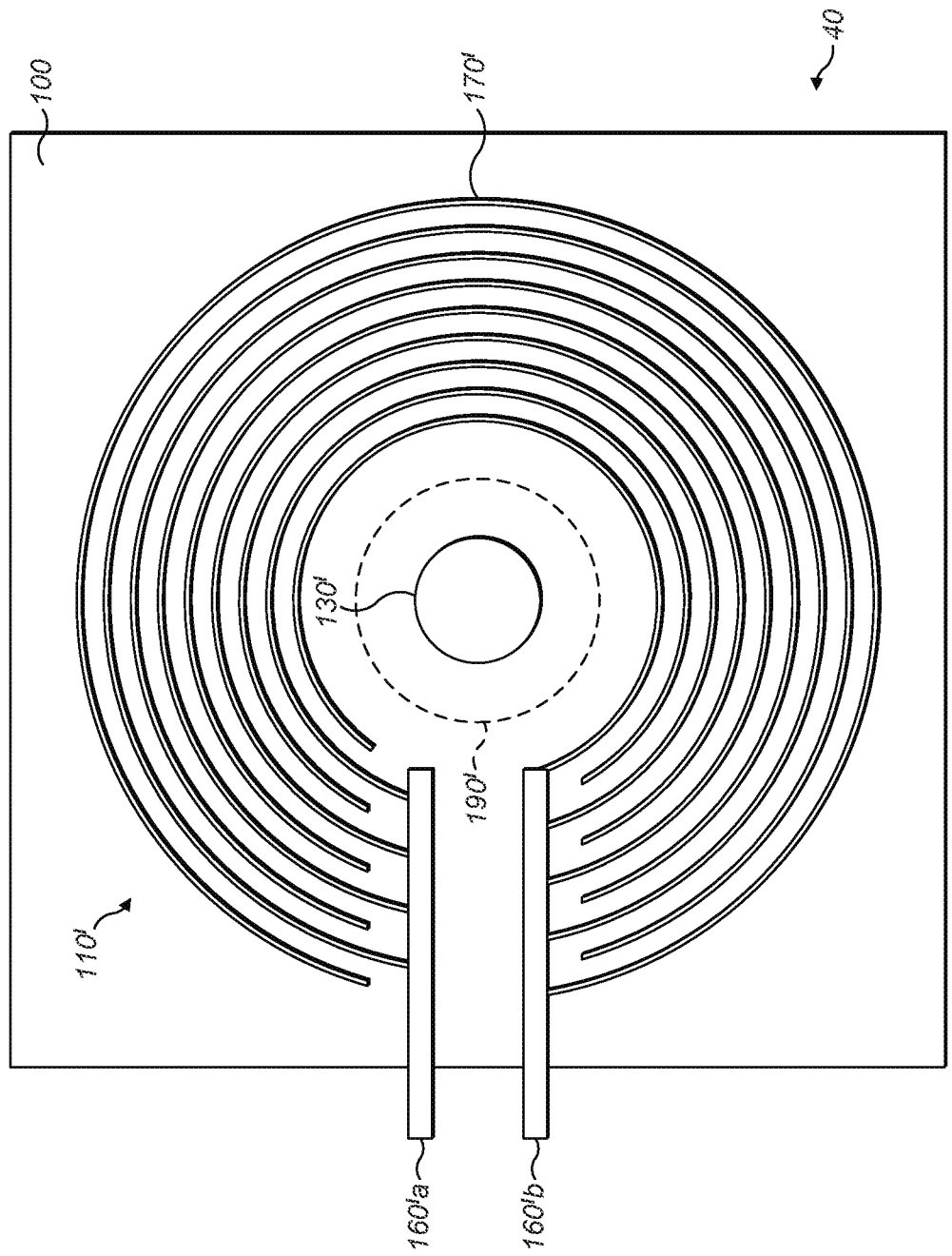
FIG. 5 shows, in plan view, a SAW nebulizer according to an alternative embodiment of the present invention.

The IDT electrodes can be straight or, for improvement of acoustic power utilization efficiency, be curved, circular or elliptical. The electrodes may substantially meet up, or may only define partial circles, ellipses etc. FIG. 5 shows one such possible arrangement. In FIG. 5, an IDT 110' is formed on the surface of a piezoelectric substrate 100. A plurality of closed circular transducer elements 170' are provided, each one interdigitally arranged between first and second IDT electrodes 160'a, 160'b as shown (i.e. so that a first transducer element extends from the first electrode 160'a in a circular arc toward (but not as far as) the second electrode 160'b whereas both elements adjacent to that first transducer element extend from the second electrode 160b in a concentric circular arc of larger and smaller radius respectively, toward but not as far as the first electrode 160a). In the arrangement of FIG. 5, liquid is supplied to a working area 190' in the center of the IDT 110'.

Additional electrode geometry modelling and optimization may be carried out, to permit shaping of the surface acoustic waves to advantageous positions. Such SAW-based PEDDs operate at a higher frequency (up to 250 MHz) and require significantly less electrical power to operate. Typical values for the power needed lie in the range of 1-5 W, with an optimum value of 0.3 W.

Even though nebulization of samples is carried out from the surface of the SAW nebulizer 40, the chemical and physical properties of the nebulizer 40 are relevant to practical implementations of the system 20. Common material used in SAW nebulizers is LiNbO3, but ZnO, AlN or lead zirconate titanate (PZT) can also be used for the piezoelectric substrate, and metal (e.g., Au, Al) for the transducer elements and electrodes forming the IDT. Although these materials may have desirable properties in the generation of suitable acoustic waves, they may be, however, of limited applicability given the constantly changing (and potentially chemically reactive and/or biologically sensitive) composition of samples to be analyzed in a plasma analyzer 10 using this system 20.

For this reason, it is proposed to employ a protective coating to improve chemical resistance and biocompatibility of the SAW nebulizer 40. As well as chemical resistance and biocompatibility, it is desirable that the coating should facilitate cleaning of the SAW nebulizer surface, should assist in the confinement of liquid on the nebulizer's working surface 190/190', and should provide (or at least help to provide) a liquid film thickness appropriate for stable and finely dispersed aerosol formation. The film thickness is a function of contact angle and has been empirically determined to be preferably less than 1 mm, and even less than 0.5 mm in some embodiments. Although such typical figures were determined on the basis of continuous liquid feeding experiments, such figures may also be favorable for pulsed samples as well, where nebulization occurs at the droplet edge. The materials which are currently preferred for provision of such a coating are $SiO_2$, $Al_2O_3$, different types of fluoropolymers such as PTFE, PFA, FEP, etc.

Figure 6A:
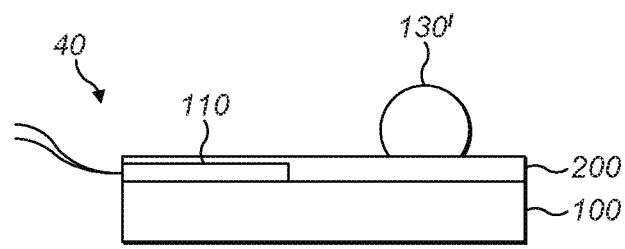
FIGS. 6a-6f show in side view.

FIG. 6a shows a simplest embodiment of a SAW nebulizer 40 in accordance with an embodiment of the present invention, in which a single coating layer 200 is applied over the top surface of the substrate 100 and the IDT 110, to cover both. Liquid thus sits on the surface of the coating 200 rather than coming into contact with either of the substrate 100 or IDT 110.

The coating 200 can be further modified to impart additional hydrophilic/hydrophobic properties to it. Additional hydrophobization facilitates the cleaning process, and hydrophilization (or, at least, not active hydrophobization) promotes formation of a thinner liquid film on the nebulizer surface, which in turn provides better nebulization conditions. The combination of hydrophilic and hydrophobic properties can help to hold the liquid sample in a position favorable for nebulization. The properties of the modified surface can represent a compromise for a broad range of sample liquids, or may be optimized for a specific sample liquid type.

Figure 6B:
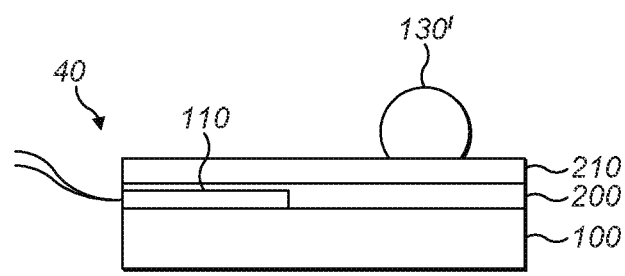
Figure 6C:
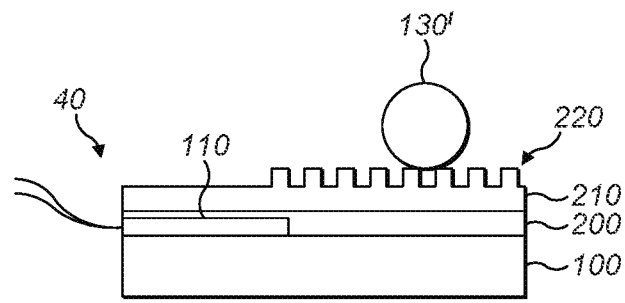

Such additional surface properties of the SAW nebulizer 40 may be imparted by superimposing an additional modifying coating 210 as a second layer on top of the coating 200 which forms a first, sandwich layer between the upper additional modifying coating 210 and the IDT 110 and substrate 100. Such an arrangement is illustrated in FIG. 6b. The liquid sample is formed or dropped upon the additional modifying coating 210 rather than the (intermediate) coating layer 200 or the IDT 110/substrate 100.

Figure 6D:
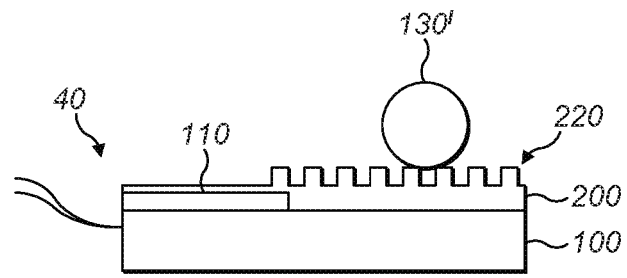
Figure 6E:
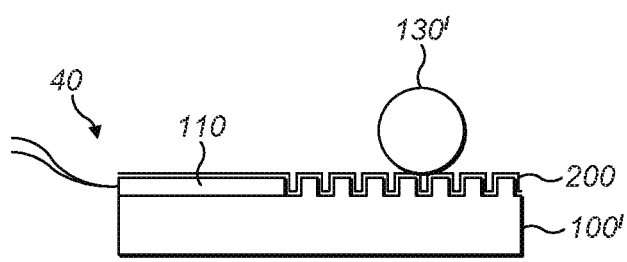
Figure 6F:
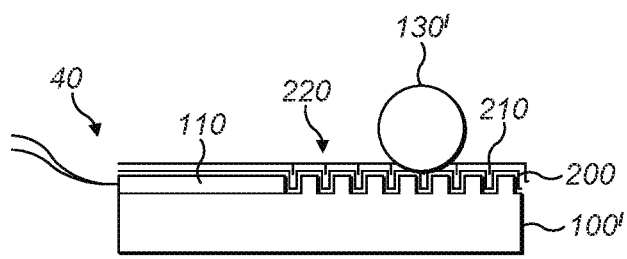

Still another approach is illustrated in FIGS. 6c-6f, in which a microstructured pattern 220 is applied as a further coating 210 to a first coating layer 200 on the surface of the SAW nebulizer (FIG. 6c), or alternatively as a single coating layer 200 to an otherwise uncoated surface of the SAW nebulizer 40 (FIG. 6d). In still another arrangement, the surface of a substrate 100' may itself may be microstructured with a pattern 220 and then coated with a coating layer 200 onto which the liquid sample 130' is placed (see FIGS. 6e and 6f; in FIG. 6e, a micropatterned substrate only is shown, whereas in FIG. 6f, a coated micropatterned substrate is shown). Thus, in total, only one coating may be modified by plasma/chemical microstructuring, or two coatings may be modified. In the latter example, a first coating layer may be used for protection of the surfaces of the substrate 100 and the IDT 110. Then, a second upper coating layer may be deposited or patterned above the lower coating layer on the substrate 100 and IDT 110, the purpose of the upper coating layer being to provide the sample properties as explained above.

Figure 6G:
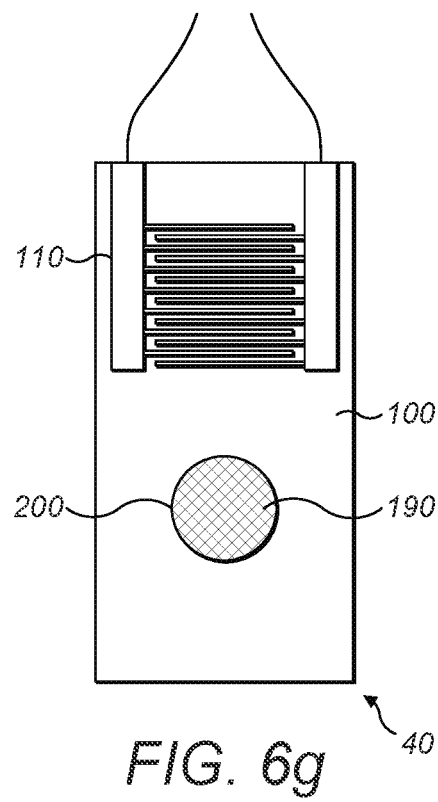
FIGS. 6g and 6h show in plan view, respectively, various coating layers applied to the SAW nebulizer of FIG. 4.
Figure 6H:
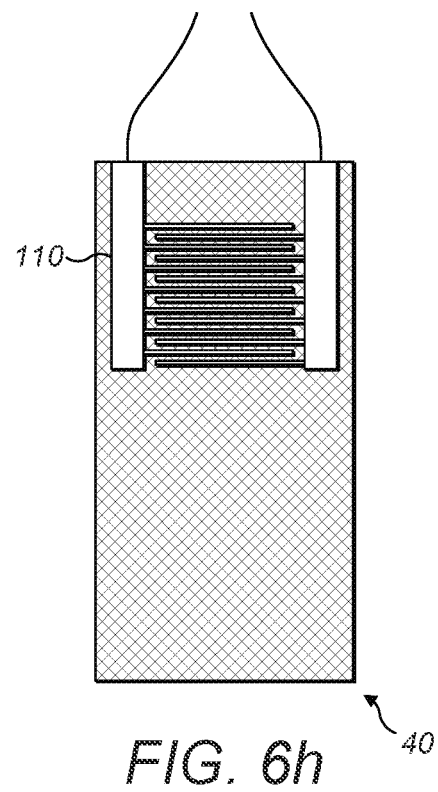
Figure 7A:
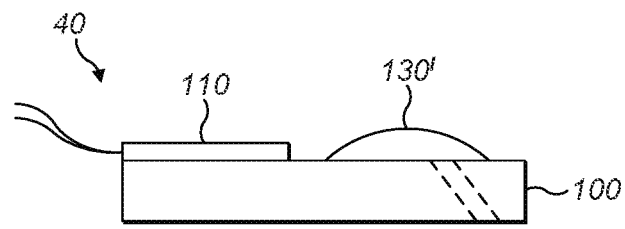
FIGS. 7a-7h show, in side view, various macrostructures applied to the surface of the SAW nebulizer of FIG. 4.
Figure 7B:
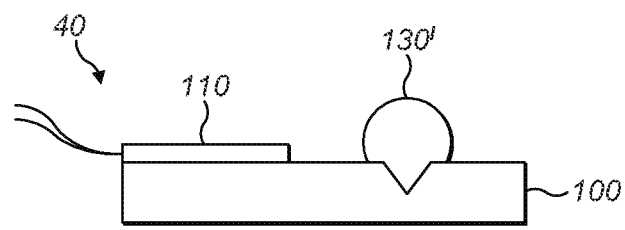
Figure 7C:
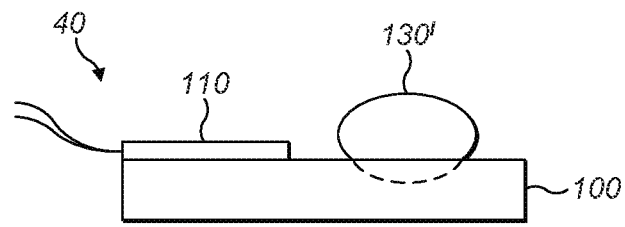
Figure 7D:
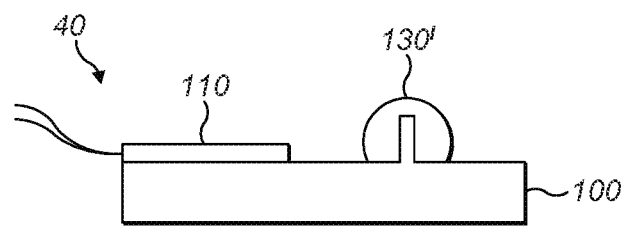
Figure 7E:
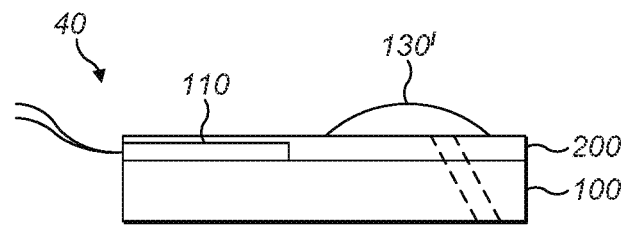
Figure 7F:
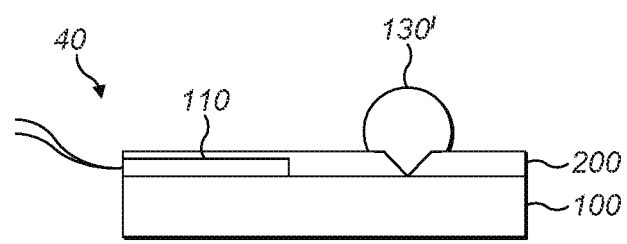
Figure 7G:
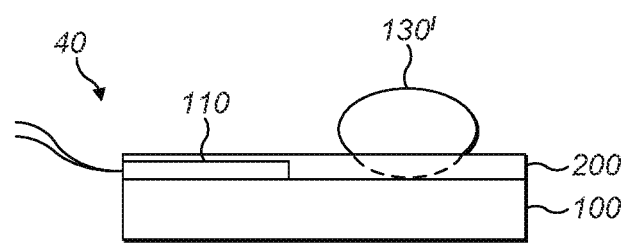
Figure 7H:
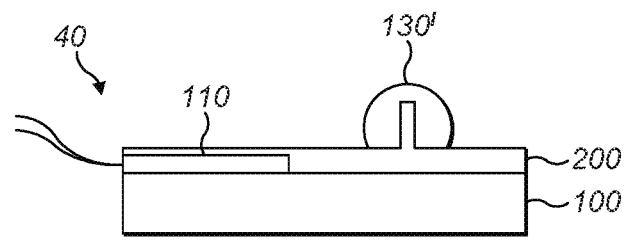

As best seen in the plan views of FIGS. 6g and 6h, either just a part of the working area 190 of the SAW nebulizer 40 may be coated with one or more coating layers (in FIG. 6g, only one coating layer 200 is shown), or alternatively the whole of the SAW nebulizer 40 may be coated as shown in FIG. 6h. It is also envisaged that different types of coatings can be deposited on different parts of the nebulizer (e.g., a hydrophilic spot in the center of the working area and a hydrophobic coating outside the spot).

Macrostructuring can, furthermore, be imposed on the surface of the SAW nebulizer 40 in order to create either abruptnesses or non-flatnesses on a macroscopic scale, in order to facilitate liquid confinement and nebulization, and also to assist with surface cleaning. Surface structures such as channels or wells may be formed, to facilitate liquid confinement there. As shown in FIGS. 7a-7d, the macrostructured pattern may include one or more of a channel(s) in the substrate (FIG. 7a), groove(s) for liquid flow (FIG. 7b); a cavity (FIG. 7c); protrusions for liquid fixation (e.g. such as an anchor for the sessile drop)—see FIG. 7d—and so forth. Such macrostructuring of the surface of the SAW nebulizer 40 can be combined with coatings, including microstructured ones, as may be seen in FIGS. 7e-7h, which correspond with FIGS. 7a-7d but with the addition of a coating layer 200.

In broad terms, the dimensions of the macrostructures applied to the surface may be in the region of 50-100 micrometers, up to some millimeters.

Furthermore the SAW nebulizer can be equipped with a passive temperature stabilizer such as a heat sink, or alternatively an active temperature stabilizer such as a Peltier element. In the latter case, the temperature may be stabilized at ambient (room) temperature, or there may be cooling or heating below or above ambient temperatures respectively using the Peltier element. The electronic controller 60 may once again be connected with the Peltier element so as to provide feedback temperature control, while, optionally, simultaneously controlling other elements of the system 20 (such as the sample delivery rate, the nebulization rate, etc.), either independently or as part of a global feedback system in which the different parameters are treated as interrelated.

Elevating the temperature of the SAW nebulizer 40 relative to ambient or room temperatures may improve the properties of the aerosol as it enters the plasma. This will be explained further below.

Figure 8A:
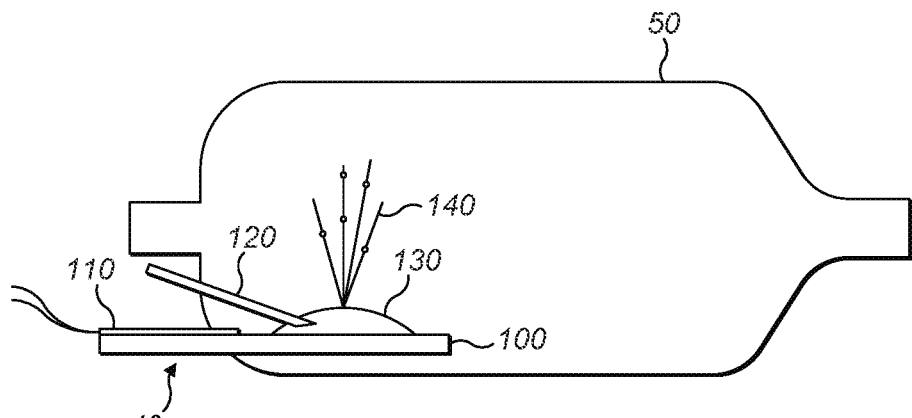
FIGS. 8a-8c show the SAW nebulizer of FIGS. 1 and 4-7, mounted in various orientations with respect to the aerosol transport apparatus of FIG. 1.

The SAW nebulizer 40 is conveniently operated with the planar surface thereof (that is, the working area 190 of FIG. 4 or 190' of FIG. 5, for example) in a horizontal orientation, as shown in FIG. 8a. In FIG. 8a, a SAW nebulizer 40 is shown mounted through the walls of a nebulization chamber representing the aerosol transport arrangement 50. Components of the SAW nebulizer labelled in FIG. 8a with reference numerals common to earlier Figures will not be described again here, for brevity.

Figure 8B:
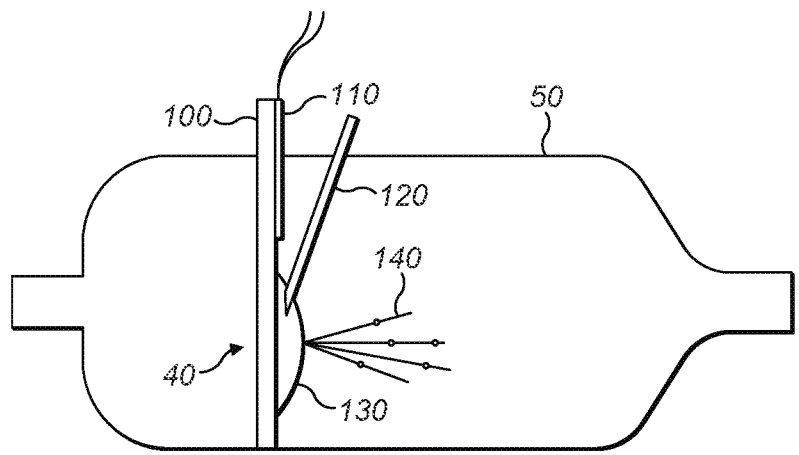
Figure 8C:
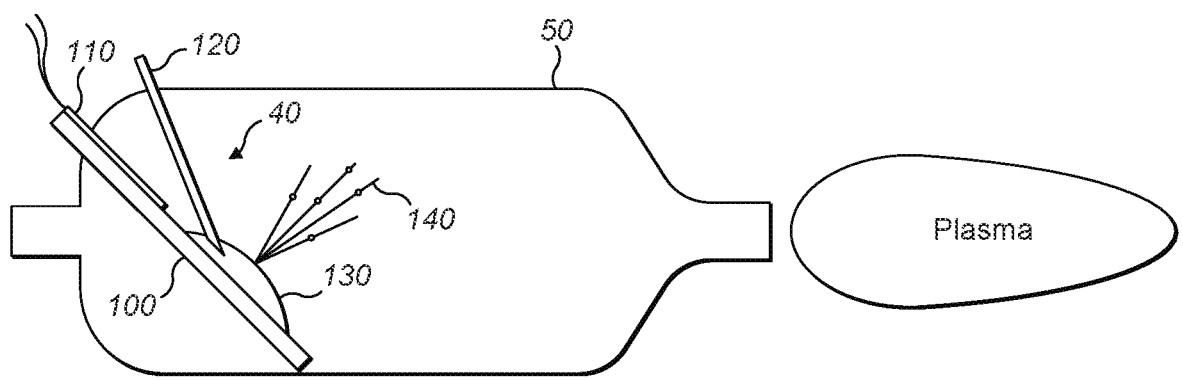

Such a horizontal orientation is not, however, essential in the system 20 embodying the present invention. FIG. 8b shows a SAW nebulizer 40 mounted with its planar surface in a vertical orientation through the walls of the aerosol transport arrangement 50, and FIG. 8c shows the planar surface (the working area) at an orientation that is neither horizontal nor vertical.

Where the working area is not horizontal, the sessile droplet 130' can be held on the surface of the SAW nebulizer 40 by surface tension force. In the case of a continuous flow of sample fluid (FIG. 2a), the fluid itself may be dribbled or sprayed down the surface of the SAW nebulizer 40, with any surplus liquid (if there is any) draining into a drain vessel (not shown in the Figures).

Electronic Controller

Figure 9:
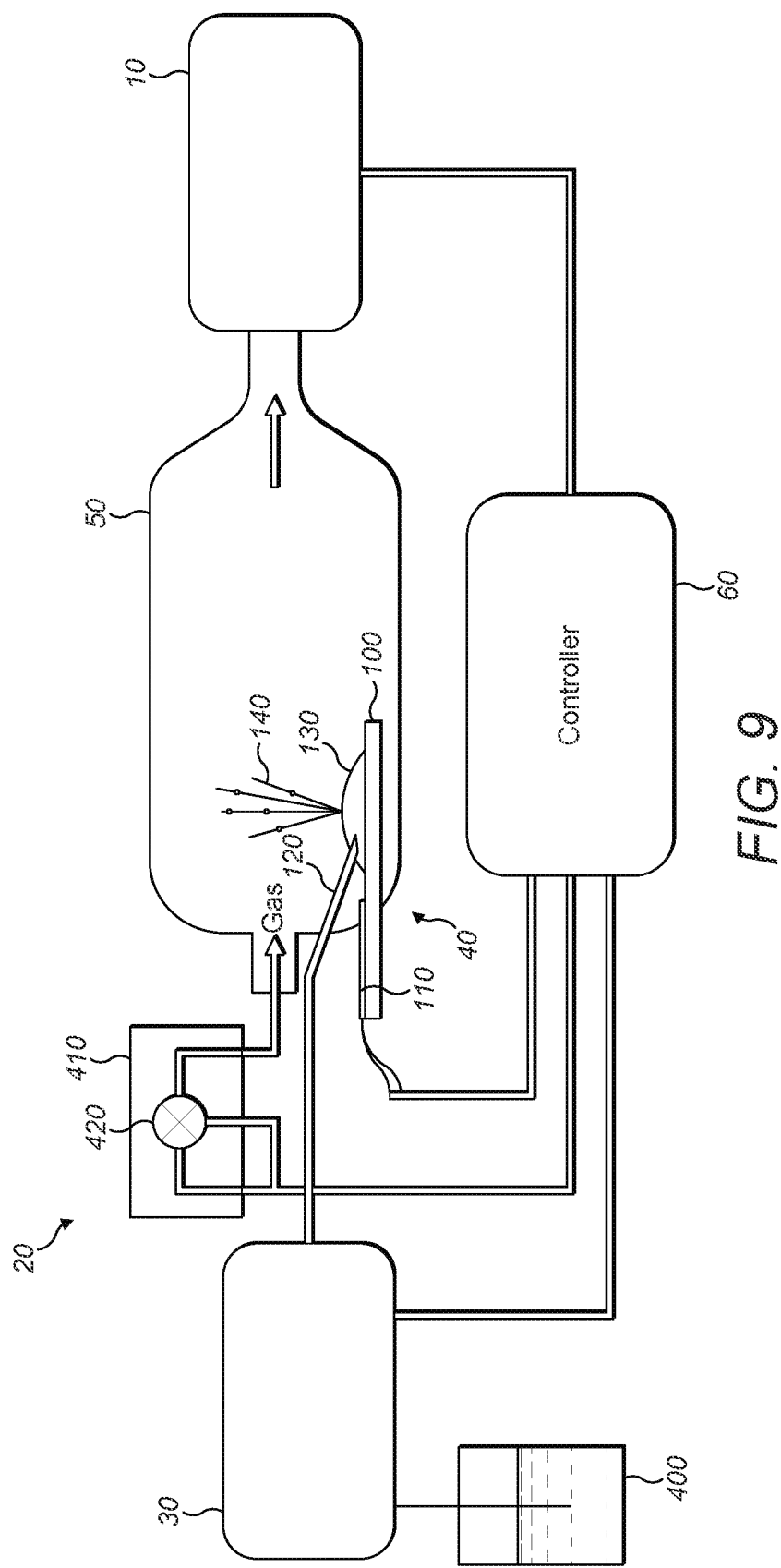
FIG. 9 shows the liquid sample introduction system and analytical plasma spectrometer of FIG. 1, in more detail.

FIG. 9 shows a more detailed schematic diagram of the liquid sample introduction system 20 of FIG. 1, to explain the various functions that may be carried out by the controller. The electronic controller 60 may perform a range of functions, both in terms of the control of the various components in the liquid sample introduction system 20, and in terms of provision of power to the SAW nebulizer 40 (which power supply may, itself, be controlled based upon desired experimentation and/or feedback measurement of liquid flow rates, nebulizer flow rates, plasma loading, etc.).

As shown in FIG. 9, the controller 60 is in communication with, and capable of controlling, the flow of sample liquid and/or rinsing solution from a liquid vessel 400, via the liquid handling system 30 to the SAW nebulizer 40. As explained in connection with FIG. 1, sample delivery to the SAW nebulizer 40 may be achieved via a pump (not shown in FIG. 9), and in that case the electronic controller 60 may control that pump. Other power requirements of the liquid handling system 30 may also be provided by the electronic controller 60.

The electronic controller 60 may also control a gas supply 410, which supplies carrier gas to the aerosol transport arrangement 50. For example, in a first embodiment, the electronic controller 60 may send control signals to the (separate) gas supply 410, or alternatively the electronic controller 60 may send control signals to the spectrometer which then in turn controls the gas delivery rate. By adjusting the rate of gas flow into the aerosol transport arrangement 50, the rate of uptake of aerosol generated by the SAW nebulizer 40 and carried into the plasma spectrometer 10 can be adjusted and controlled. Moreover, by connecting the electronic controller 60 to the aerosol transport arrangement 50, the controller 60 can send delayed electrical pulses to an electromagnetic valve 420 (FIG. 9) in a passive desolvation aerosol transport system 50.

In terms of the supply of electrical (RF) power to the SAW nebulizer 40, this may be adjustable in real time by the electronic controller 60 so as to obtain an aerosol delivery rate that matches the requirements of each specific analytical measurement. Real time adjustability of the power supplied to the SAW nebulizer 40 by the electronic controller 60 may be achieved by setting of the output amplitude of the driving voltage, by pulse width modulation (PWM), by amplitude modulation (AM), and so forth. The amplitude, waveform and main frequency of the RF driving pulses can be separately optimized for each analytical procedures (cleaning, sample nebulization, etc.).

FIG. 9 also indicates communication between the electronic controller 60 and the plasma spectrometer 10. A further capability of the electronic controller 60 is then that it may send/receive trigger pulses and control signals to/from the plasma spectrometer 10 (or, more particularly, a computer thereof) for synchronization between the start of nebulization at the SAW nebulizer 40, and the start of the analytical signal measurement by that computer of the plasma analyzer 10, and also for adjustment of sample delivery rate depending on analytical signal intensity, severity of matrix effects or interferences.

Globally, additional feedback control of the sample introduction system 20 may be achieved through the electronic controller 60, based on optical, resistive or capacitive sensors to control the reproducibility of sample delivery and sample nebulization processes. Furthermore, visual/automated control of liquid delivery and nebulization processes, as well as liquid interface alignment, may be enabled by a video camera (not shown in FIG. 9), again under the control of the electronic controller 60.

To perform the above mentioned functions, the electronic controller 60 may include one or more of the following components: a modulated RF generator, an impedance matching unit, attenuators, triggers and other electronic circuits typical for RF generators, and also microprocessors, microcontrollers or field-programmable gate arrays (FPGA) typical for control units.

Aerosol Transport System

The main aim of the aerosol transport system 50 is transfer of the sample solution aerosol nebulized by the SAW nebulizer 40, into the plasma torch, with minimal losses. Depending upon the analytical application, the aerosol transport system 50 may have a relatively simple, compact design to allow assembly of the whole sample introduction system 20 directly at the plasma torch. Indeed, a combined, one-piece device comprising a sample introduction system 20, a plasma torch and a liquid vessel 400 may be envisaged. Alternatively, a more sophisticated design may be contemplated, to provide additional optional functionality.

One such additional option is aerosol modification, with the aim of entirely avoiding the harmful influence of either excessive amounts of solvent in liquid form, or unwanted larger droplets entering the plasma, based upon analytical figures of merit. Techniques for aerosol modification might include desolvation of the initial (primary) aerosol, or aerosol size filtration. Desolvation is the preferred technique, should the desired liquid delivery rate become so high that plasma loading effects becoming prominent.

Active desolvation—that is, the deliberate changing of one or more physical parameters in the system with the aim of accelerating desolvation—may be achieved, as is known in the art, by acceleration of the vaporization rate of sample droplets, for example by heating of the carrier gas supplied by the gas supply 410. The same acceleration can be obtained by increasing the initial temperature of the aerosol, e.g. by heating of the SAW nebulizer 40 itself. In that case, the temperature of the SAW nebulizer 40 is optimally limited so as not to exceed half of the Curie temperature of the piezomaterial forming the substrate 100 of the SAW nebulizer 40. An additional step of cooling the aerosol (e.g. in a condenser) may be implemented, in order further to decrease solvent content in the flow of gas and sample into the plasma.

As an alternative to active desolvation, a passive desolvation technique may be employed. Here, the residence time of droplets within the aerosol transport arrangement 50 is deliberately extended. In the case of an aerosol, passive desolvation can be realized by increasing the inside volume of the aerosol transport arrangement 50, or by decreasing the flow rate of gas from the gas supply 410, which is used to transport the aerosol. To avoid the constraints that arise from a central channel gas flow rate, two gas flows can be used, a first, relatively slow gas flow providing aerosol transport, and a second, relatively faster gas supply, supplied downstream just before the torch injector raising the total central channel gas flow rate to the desired value.

Active and passive desolvation approaches can be combined, depending upon the demands on temperature levels used in any active desolvation system.

One of the advantages of the system in accordance with embodiments of the present invention is that it facilitates passive desolvation by making use of features of the system that are preferably present in any event. In particular, the system 20 embodying the present invention permits straightforward modulation of the introduction of the aerosol into the aerosol transport arrangement 50. Introduction of the aerosol into the plasma can also be delayed, relatively to the start of a nebulization pulse train, by halting the flow of carrier gas from the gas supply 410, e.g. by closing an electromagnetic valve 420 (FIG. 9) of that gas supply 410. Again, that process can be controlled automatically by the electronic controller 60 or may be achieved manually by a user.

The following exemplary operational workflow/sequence is provided for the sake of illustration only and it will of course be understood that a different order of actions, or different actions, can be used instead.

In a first step, the electromagnetic valve 420 of the gas supply 410 is closed. Next, the controller 60 sends a trigger signal to the liquid handling system 30 and the SAW nebulizer 40 to start a flow of liquid sample to the nebulizer, and to activate the nebulizer. A short initial nebulization period then takes place, during which no carrier gas is supplied as the electromagnetic valve 420 remains closed. Following that short initial nebulization period, the controller 60 instructs the electromagnetic valve 420 to open, resulting in a flow of carrier gas that sweeps the aerosol through the aerosol transport arrangement 50 and into the plasma. Simultaneously, the controller 60 instructs the computer of the plasma analyzer to start measurement.

During the initial delay (the period of initial nebulization during which no carrier gas is supplied) the aerosol has more time for desolvation. Any unwanted large sample droplets may also settle gravitationally inside the aerosol transport arrangement 50, so that they are not carried into the plasma and do not deleteriously affect analytical measurements. In other words, the system 20 of embodiments of the present invention may additionally be considered as a droplet desolvation/separation device (see also below). Further, to avoid a variation in plasma parameters resulting from modulation of the supply of gas from the gas supply 410, a by-pass system may be used. Specifically, a 3-way electromagnetic valve may be included, just before an injector for injecting the aerosol into the plasma. In this arrangement, during a stopped phase of aerosol delivery, bypass gas enters the plasma. The bypass flow rate can differ from the flow rate of the carrier gas which transports the sample aerosol. The bypass path can also be equipped with an additional nebulizer which nebulizes blank solution in order to maintain a constant solvent concentration in the plasma during a stopped phase.

This approach, which uses a delayed final aerosol delivery, is especially attractive in the case of a compact transport system, having high carrier gas flow rates and low sample delivery rates, when the kinetic aspects of droplet vaporization and separation are of the greatest importance.

It should be noted that all of the above-mentioned additional gas paths may equally be used for real-time aerosol gas dilution, when necessary. Implementation may be achieved by addition of gas regulators or valves, or by replacement of existing ones.

An arrangement having a very high gas flow (up to 10 L/min) that enters the aerosol transport arrangement 50 requires an aerosol splitter positioned at the end of the aerosol transport arrangement 50 distal from the SAW nebulizer 40 (that is, the end of the aerosol transport arrangement 50 proximal to the plasma). Such an aerosol splitter system may improve aerosol desolvation, especially in the case of high sample delivery rates.

Another method typically used for aerosol modification is droplet size filtration/separation. Size filtration can be realized using various known types of spray chambers used in analytical plasma spectrometry (such as cyclonic, impact bead, Scott type, etc.). Accordingly, in some embodiments, the sample introduction system comprises a spray chamber for droplet size filtration, especially for removal of larger droplets, positioned between the nebulizer and the plasma or flame. The aerodynamic behaviour of aerosol droplets (i.e. their initial start position, velocity and movement direction) that are generated by SAW nebulizers appear to be correlated with droplet size. By proper management of the carrier gas flow from the gas supply 410, the trajectories of the larger droplets can be affected strongly enough that they can be separated in the vicinity of the liquid surface. This then offers the possibility of redirecting these oversized droplets back onto the surface of the SAW nebulizer 40, where they may be recollected and renebulized.

A number of embodiments have been described, by way of example only. The skilled reader will recognise that various modifications and additions could however be contemplated. For example, the embodiment of FIG. 9 suggest the use of stationary apparatus, where the sample solution in the liquid vessel 400 is continuously aspirated through liquid transfer lines and a liquid interface (classical arrangement) or dropped onto the surface of the SAW nebulizer 40 by pipette, in the form of a sessile droplet 130'. However, pumpless and tubeless arrangements are equally contemplated. Two such arrangements are shown in FIGS. 10 and 11.

Figure 10:
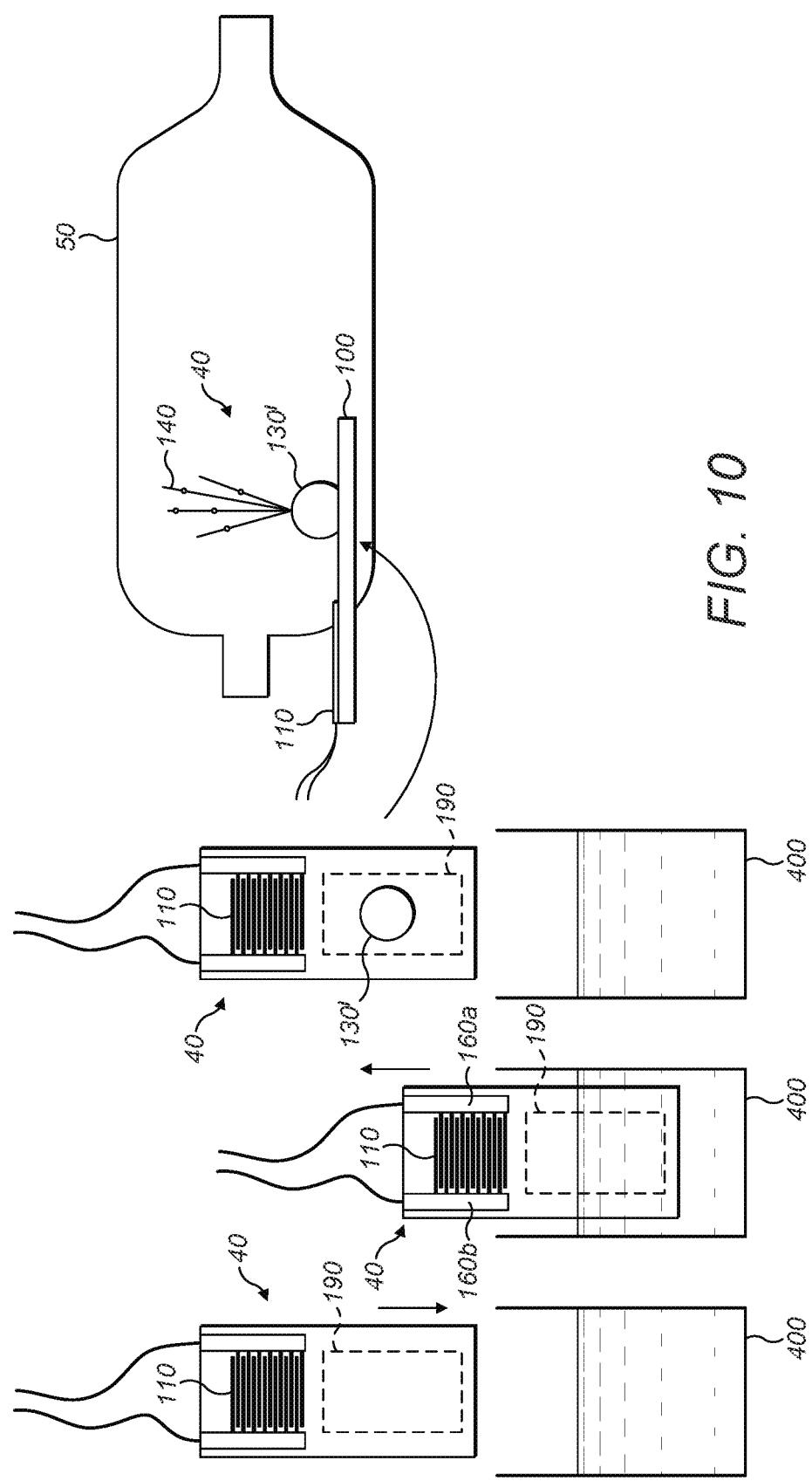
FIG. 10 illustrates a first arrangement of a pumpless, tubeless liquid handling system.

In FIG. 10, the SAW nebulizer 40 is itself used as a pipette. A blank SAW nebulizer 40 (FIG. 10, left hand image) is brought into liquid contact with sample solution in a liquid vessel 400 (FIG. 10, second left). The working area 190 on the substrate (which may be coated as described above in connection with FIGS. 6a-6h, for example) is immersed into the liquid, while, preferably, the IDT110 is held above the surface of the liquid. Once sample has been taken onto the working area 190 in a form of a sessile droplet, the SAW nebulizer 40 is withdrawn from the liquid vessel (FIG. 10, third left) and introduced, with the sessile droplet 130' still in place, into the aerosol transport arrangement 50 (shown in side sectional view in the right hand image of FIG. 10). Then, liquid nebulization from the sessile droplet 130' and transport of the resulting aerosol into the plasma can take place as described above.

Figure 11:
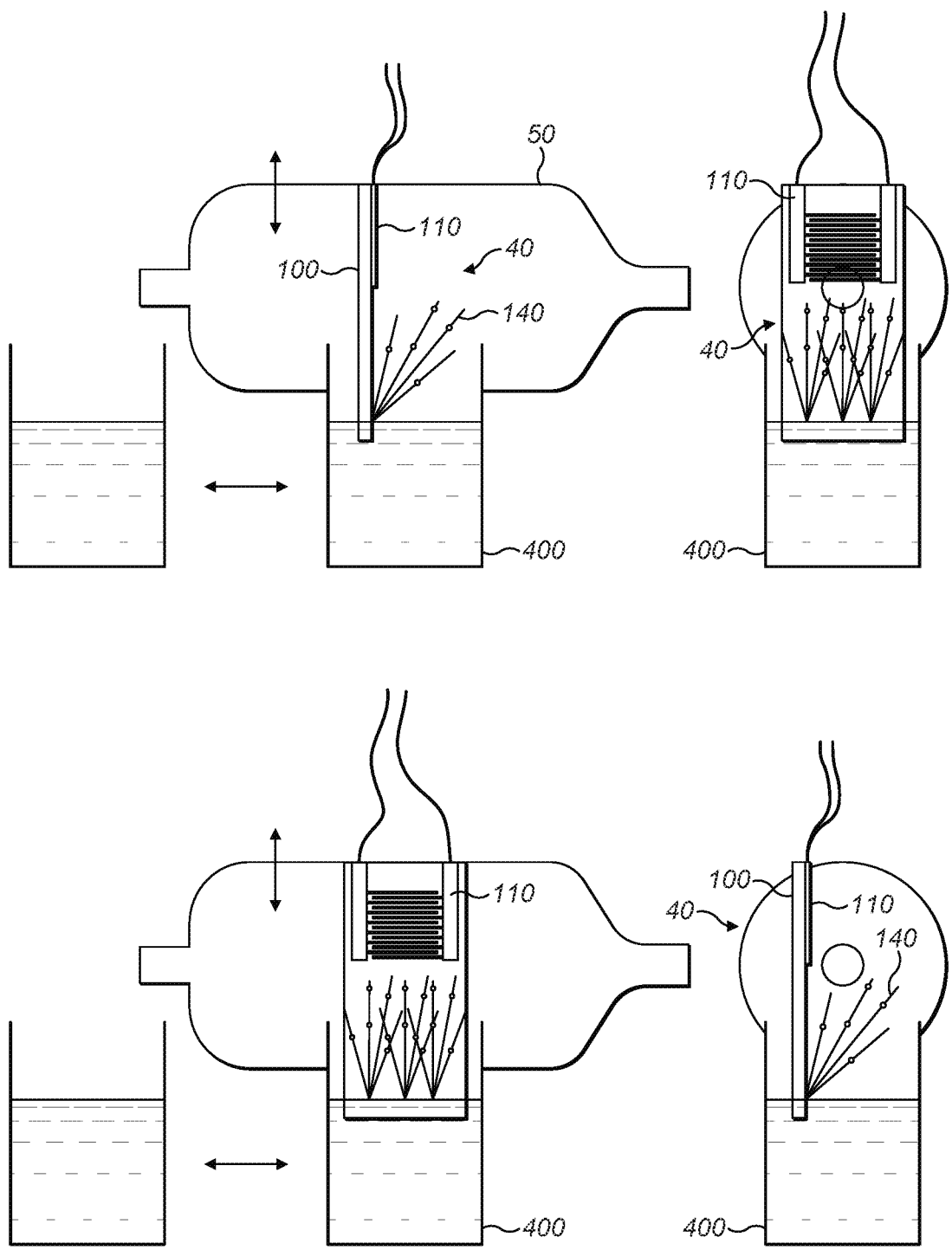
FIG. 11 illustrates a second arrangement of a pumpless, tubeless liquid handling system.

FIG. 11, by contrast, shows various side and front sectional view of an alternative pumpless and tubeless arrangement for generating a sample aerosol and transporting it to a plasma. In FIG. 11, the SAW nebulizer 40 forms an integral part of the sample introduction system 20. The SAW nebulizer 40 may be immersed into the liquid vessel 400 during nebulization, so that the SAW nebulizer 40 has direct contact with the sample solution in the liquid vessel 400. As can be seen from FIG. 11, the aerosol transport arrangement 50 forms a closed/gas tight system with the liquid vessel 400 when the SAW nebulizer 40 is immersed into the sample liquid and nebulization takes place.

In the arrangements of FIGS. 10 and 11, therefore, the whole liquid feeding system, with the various liquid paths, becomes unnecessary. The embodiments of FIGS. 10 and 11 take advantage of the reduced size of the SAW nebulizer 40 relative to prior art nebulizers, and the ability of the SAW nebulizer to operate in self-aspirating mode and in vertical/inclined orientations (FIGS. 8a-8c). Sample introduction systems that avoid the use of pumps and liquid feed lines, such as the systems illustrated in FIGS. 10 and 11, are particularly attractive for rapid semi-quantitative and even quantitative chemical analysis. In such analysis, potential changes in the analytical signals, resulting from variations in sample delivery rates can be mitigated by the use of internal standards.

Figure 12:
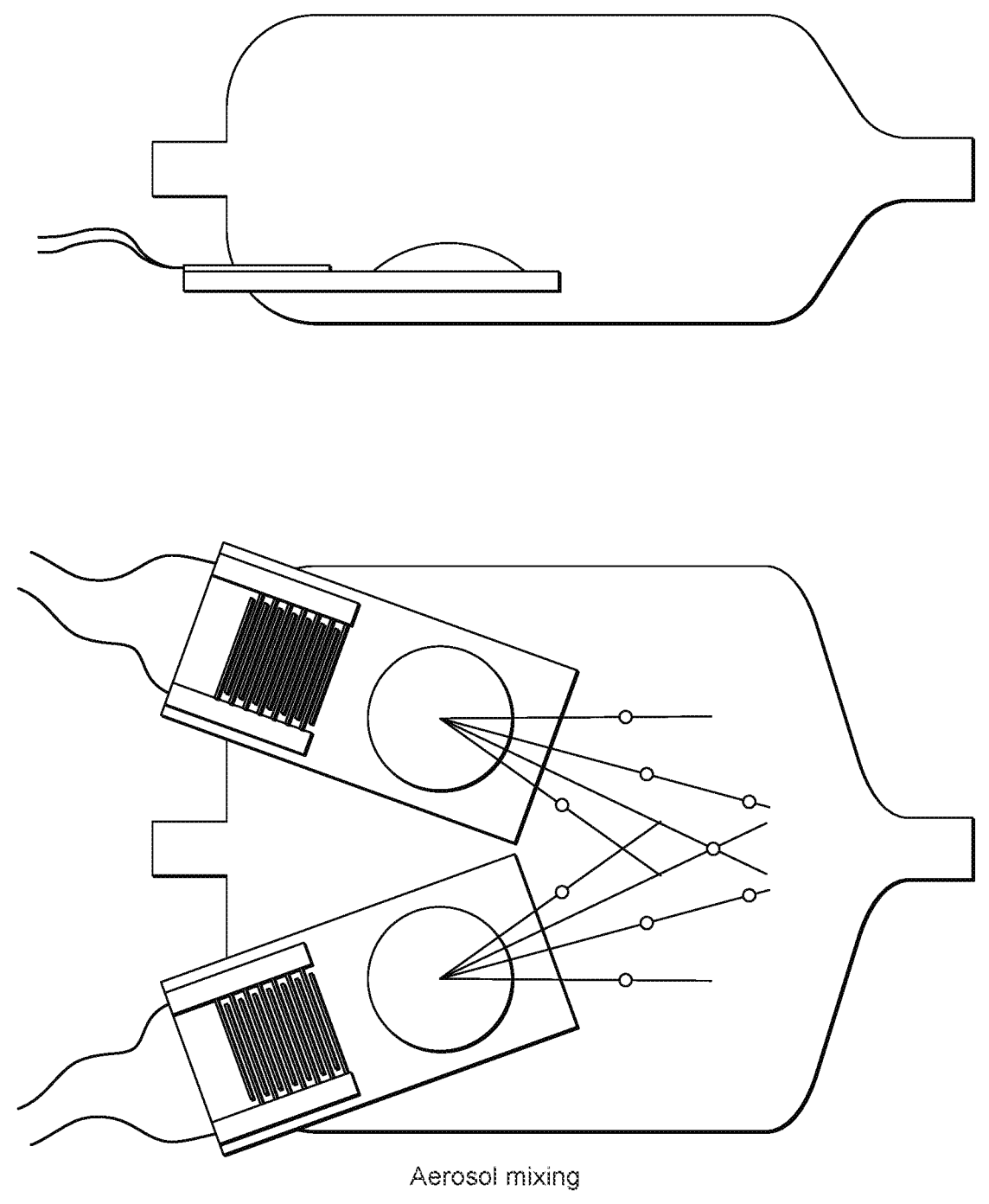

Mixing of aerosols is also contemplated as shown in FIG. 12. For example, aerosols may be mixed above the surface of the SAW nebulizer 40. A double nebulizer design can be realized, where, for example, one nebulizer can be employed for the sample solution and a second nebulizer can be employed either for standards (using an on-line standard addition method) or for blank samples (on-line dilution), etc.

Figure 13A:
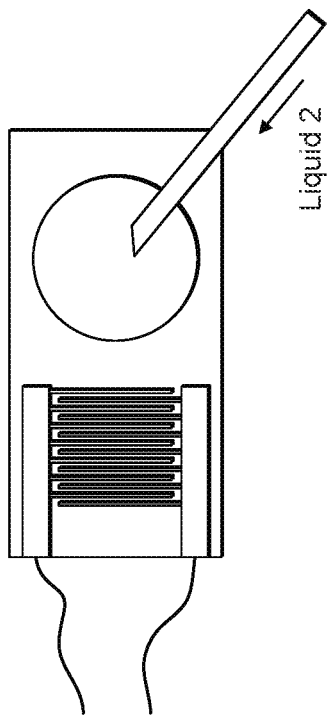
FIGS. 13a and 13b show, respectively, mixing of liquids with wet and dry samples on a SAW nebulizer.
Figure 13A:
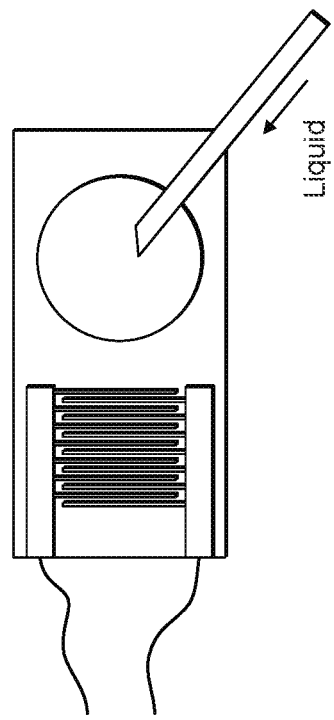
Figure 13B:
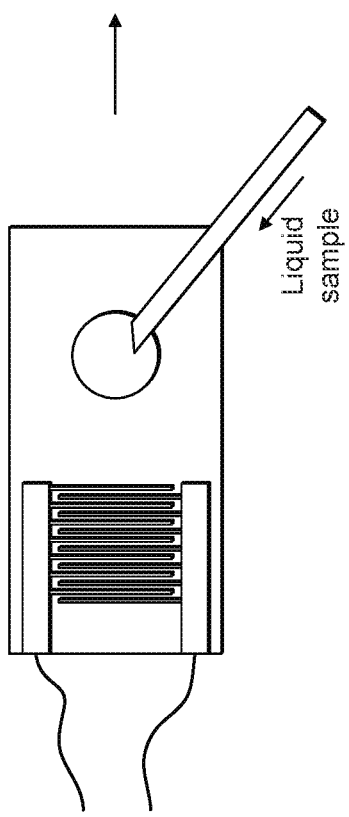
Figure 13B:
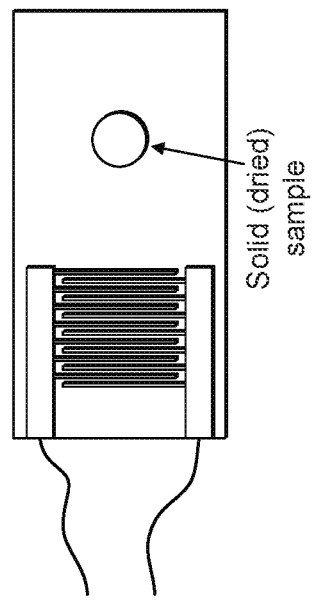

Alternatively, liquids may be mixed on the nebulizer working surface instead. These liquids can be diluents, internal standards, matrix modifiers, and so forth. They can be fed onto the working area 190 of the SAW nebulizer 40 through the same, or through separate individual liquid interfaces as shown in FIG. 13a. The same approach can also be used for the dissolution and modification of any sample previously deposited on the nebulizer surface and which has dried upon it (dried spot analysis) as shown in FIG. 13b.

Finally the system, nebulizer and method of embodiments of the present invention are suited to a variety of cleaning techniques. One of the inherent properties of all types of nebulizers is a deposition of dissolved solids on the wetted borders of the working surface. The high efficiency and orifice free nature of a SAW nebulizer makes deposition less prominent and harmful, but some deposition is still possible and it is desirable in that case to take steps to address the issue.

In a first cleaning technique, the SAW nebulizer 40 may be placed in a container with flowing rinsing solution (e.g., a rinsing station). To accelerate the cleaning process, the SAW nebulizer 40 could be energized during rinsing.

In a second technique, the working area 190 of an energized SAW nebulizer 40 may be sprayed with a rinsing solution.

In a third technique, the working area 190 of the SAW nebulizer 40 may be sprayed with a rinsing solution while the SAW nebulizer is inactive (i.e., not energized). Used rinsing solution may be collected in a drain vessel.

The second and third cleaning methods can, optionally, be carried out together.

Embodiments of the present invention have various applications. For example, the techniques outlined above are suitable for analysis of microsamples, such as (semi)quantitative analysis of a sample on the nebulizer surface. For example, fingerprints or soluble solids (after liquid digestion, dissolving or desorption of such solid samples when they have been added to the surface of the SAW nebulizer 40) may be analyzed this way. Flow microinjection, hyphenation techniques (e.g. interfacing the SAW nebulizer to downstream liquid chromatography, capillary electrophoreses, ion chromatography, etc.) can also beneficially be carried out using the system, nebulizer and methods described herein.

Critical applications requiring absolute elimination of cross-contaminations (e.g. "blood spot analysis") are also well suited to the concepts described here, because a single-use, inexpensive SAW chip can be employed.

Analysis of samples with high total dissolved solids (TDS) content is facilitated, because of an absence of clogging problems with a SAW nebulizer.

The techniques are also well suited to nanoparticulate analysis, due to a high nebulization efficiency, which improves both the accuracy and the precision of determination of particle size and number concentration.

Single cells analysis is favorable, due to high nebulization efficiency, and due to the very high frequency and low power used. Low power and high frequency minimises cell destruction.

Robotized high sample throughput analysis is possible.

Analysis of samples having a wide range of analyte or matrix element concentrations can be achieved by real-time variation of the sample delivery rate (which is linearly dependent upon the power applied to the SAW nebulizer 40).

The invention claimed is:

1. A liquid sample introduction system for a plasma spectrometer, comprising:
   (a) a sample container for holding a liquid sample;
   (b) a surface acoustic wave (SAW) nebulizer, arranged to receive a liquid sample from the sample container, the SAW having a transducer disposed on a surface of the SAW nebulizer, and the SAW having a groove on the surface for holding the liquid sample;
   (c) an electronic controller for supplying electrical power to the SAW nebulizer so as to produce a surface acoustic wave on a surface of the SAW nebulizer, for generating an aerosol from the supplied sample liquid; and
   (d) an aerosol transport arrangement for receiving the aerosol from the SAW nebulizer and carrying it into a plasma or flame of a spectrometer;
   the electronic controller being further configured to control the electrical power to the SAW nebulizer so as to permit adjustment of the aerosol parameters, and to control the aerosol transport arrangement so as to permit adjustment of the aerosol delivery into the plasma or flame of the spectrometer at least in part by adjusting a delivery of a carrier gas at a time that is delayed relative to the control of the electrical power to the SAW nebulizer for generating the aerosol.

2. The system of claim 1, further comprising a liquid sample transport arrangement configured to transport the liquid sample between the sample container and the SAW nebulizer, and to deliver the liquid sample as a continuous and/or pulsed liquid flow.

3. The system of claim 2, wherein the electronic controller is further configured to control a flow rate of the liquid sample to the SAW nebulizer.

4. The system of claim 3, the liquid sample transport arrangement further comprising a pump, the electronic controller being configured to control the pump so as to produce either a substantially continuous flow of liquid sample from the liquid sample transport arrangement to the SAW nebulizer, or a pulsed flow of liquid sample from the liquid sample transport arrangement to the SAW nebulizer.

5. The system of claim 4, wherein the pump is selected from the list comprising a syringe pump, a gas-displacement pump, a peristaltic pump and a piezo micro pump.

6. The system of claim 5, wherein the electronic controller is configured to control the pump so as to produce a continuous flow of liquid sample having a flow rate, at the SAW nebulizer, of between 0.1 µL/minute and 1000 µL/minute.

7. The system of claim 2, wherein the liquid sample transport arrangement includes a pipette for dispensing droplets of liquid sample onto the SAW nebulizer.

8. The system of claim 7, wherein the electronic controller is configured to control the pipette so as, in turn, to control a flow rate of the liquid sample from the pipette to the SAW nebulizer.

9. The system of claim 3, the liquid sample transport arrangement further comprising a pump, the electronic controller being configured, during a first time period, to control the pump so as to produce a substantially continuous flow of sample liquid onto the saw nebulizer and, during a second time period, to control the pump so as to produce a pulsed flow of liquid sample.

10. The system of claim 2, further comprising a sample interface located between the liquid sample transport arrangement and the SAW nebulizer, the sample interface comprising a liquid feed line extending adjacent to the SAW nebulizer surface.

11. The system of claim 10, wherein an end of the liquid feed line extends immediately adjacent to the SAW nebulizer surface so that a liquid droplet at the end of the liquid feed line is simultaneously in contact with both the liquid feed line and the SAW nebulizer surface.

12. The system of claim 10, wherein an end of the liquid feed line is positioned adjacent to, but separated from, the SAW nebulizer surface, the system further comprising a propulsion means for propelling liquid sample from the end of the liquid feed line towards the surface of the SAW nebulizer as a jet.

13. The system of claim 11, wherein the liquid feed line comprises a microchannel embedded in the SAW nebulizer.

14. The system of claim 10, wherein the liquid feed line comprises a wick formed from a porous medium.

15. The system of claim 2, wherein the electronic controller is configured to control the liquid sample transport arrangement and the SAW nebulizer so that a flow rate of the liquid sample onto the SAW nebulizer is substantially the same as, or greater than, the rate of nebulization of the supplied liquid sample, by the SAW nebulizer.

16. The system of claim 1, wherein the aerosol transport arrangement further comprises desolvation means for removing solvent from the aerosol.

17. The system of claim 16, wherein the desolvation means comprises an active desolvation arrangement, configured to accelerate desolvation.

18. The system of claim 16, wherein the desolvation means comprises a passive desolvation arrangement, configured to prolong droplet residence time within the aerosol transport arrangement.

19. The system of claim 1, wherein the SAW nebulizer includes one or more interdigital transducers (IDTs) mounted upon a piezoelectric substrate.

20. The system of claim 19, wherein the IDT is formed as a plurality of curved electrodes having a central region within the curved electrodes, for receiving the liquid sample from the sample container.

21. The system of claim 19, wherein the IDT and/or the piezoelectric substrate are coated with one or more of $SiO_2$, $Al_2O_3$ and/or a fluoropolymer.

22. The system of claim 19, further comprising a microstructured pattern, formed in or on, or applied to, the surface of the SAW nebulizer.

23. The system of claim 1, wherein the electronic controller is configured to generate a progressive surface acoustic wave upon the surface of the SAW nebulizer.

24. The system of claim 1, wherein the electronic controller is configured to generate a standing surface acoustic wave upon the surface of the SAW nebulizer.

25. The system of claim 1, further comprising a temperature stabilization device connected with the SAW nebulizer, wherein the temperature stabilization device is a heatsink or a Peltier element.

26. A method of introducing a liquid sample into an analytical plasma spectrometer, comprising the steps of
   (i) supplying a liquid sample to a groove disposed on a surface acoustic wave (SAW) nebulizer;
   (ii) supplying electrical power to the SAW nebulizer on the surface so as to produce a surface acoustic wave on the surface of the SAW nebulizer, such that an aerosol is formed from the supplied liquid sample; and
   (iii) transporting the aerosol through an aerosol transport arrangement and into a plasma or torch of the analytical plasma spectrometer at least in part by adjusting a delivery of a carrier gas at a time that is delayed relative to the control of the electrical power to the SAW nebulizer for generating the aerosol.

27. The method of claim 26, further comprising supplying the liquid sample to the SAW nebulizer as a continuous flow of liquid.

28. The method of claim 26, further comprising supplying the liquid sample to the SAW nebulizer as a pulsed flow of liquid.

29. The method of claim 26, comprising supplying the liquid sample to the SAW nebulizer as a continuous flow of liquid during a first time period and as a pulsed flow of liquid during a second time period.

30. The method of claim 26, comprising controlling a flow rate of the continuous flow of liquid sample to the SAW nebulizer, to between 0.1 µL/minute and 1000 µL/minute.

31. The method of claim 27, comprising controlling the sample droplet volume of the pulsed flow of liquid sample to the SAW nebulizer, to between 0.1 µL and 100 µL.

32. The method of claim 26, further comprising controlling a flow rate of the liquid sample to the SAW nebulizer so as to be substantially the same as, or greater than, the rate of nebulization of the supplied sample liquid by the SAW nebulizer.

33. The method of claim 26, further comprising desolvating the aerosol between the SAW nebulizer and the plasma.

34. The method of claim 32, further comprising heating the SAW nebulizer and then subsequently cooling the heated aerosol in order to actively desolvate it.

35. The method of claim 26, wherein the SAW nebulizer comprises a substrate and an electrode arrangement thereon, the method further comprising coating the substrate and/or electrode arrangement of SAW nebulizer, or forming the substrate and/or electrode arrangement from, a chemically resistant, biocompatible material.

36. The method of claim 34, further comprising coating the substrate and/or the electrode arrangement with one or more of $SiO_2$, $Al_2O_3$, and/or a fluoropolymer.

* * * * *